(12) United States Patent
Gomi et al.

US008319618B2

(10) Patent No.: US 8,319,618 B2
(45) Date of Patent: Nov. 27, 2012

(54) IMAGE PROCESSING APPARATUS, IMAGE PROCESSING METHOD, AND RECORDING MEDIUM

(75) Inventors: Toshiaki Gomi, Kawasaki (JP); Seiya Shimizu, Kawasaki (JP); Hiroshi Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 581 days.

(21) Appl. No.: 12/585,240

(22) Filed: Sep. 9, 2009

(65) Prior Publication Data

US 2010/0134325 A1    Jun. 3, 2010

(30) Foreign Application Priority Data

Nov. 28, 2008  (JP) ................................. 2008-305018

(51) Int. Cl.
*B60Q 1/00*   (2006.01)
(52) U.S. Cl. ... 340/435; 340/436; 340/927; 340/995.14; 348/148; 348/149; 701/301
(58) Field of Classification Search ............. 340/995.14, 340/435, 436, 937; 348/115, 118, 148, 149, 348/143; 349/149; 382/284, 285, 104, 106; 701/301
See application file for complete search history.

(56) References Cited

U.S. PATENT DOCUMENTS

| | | | |
|---|---|---|---|
| 5,410,346 A * | 4/1995 | Saneyoshi et al. ............ | 348/116 |
| 6,961,661 B2 * | 11/2005 | Sekiguchi ..................... | 701/301 |
| 7,161,616 B1 | 1/2007 | Okamoto et al. | |
| 7,170,548 B2 * | 1/2007 | Ishikawa ....................... | 348/148 |
| 7,307,655 B1 | 12/2007 | Okamoto et al. | |
| 7,782,179 B2 * | 8/2010 | Machii et al. ................. | 340/435 |
| 2002/0167589 A1 | 11/2002 | Schofield et al. | |
| 2003/0021490 A1 | 1/2003 | Okamoto et al. | |
| 2003/0085999 A1 | 5/2003 | Okamoto et al. | |
| 2007/0041659 A1 | 2/2007 | Nobori et al. | |

FOREIGN PATENT DOCUMENTS

| | | |
|---|---|---|
| EP | 1 179 958 | 10/2000 |
| JP | 2002-166802 | 6/2002 |
| JP | 2003-204547 | 7/2003 |
| JP | 2004-361112 | 12/2004 |
| JP | 2007-36668 | 2/2007 |
| JP | 2007-180720 | 7/2007 |
| JP | 2008-21234 | 1/2008 |
| JP | 2008-279875 | 11/2008 |
| WO | 00/07373 | 2/2000 |
| WO | WO 00/64175 | 10/2000 |
| WO | 2006/087993 | 8/2006 |

OTHER PUBLICATIONS

European Search Report dated Mar. 29, 2010 and issued in corresponding European Patent Application 09169574.2.
Japanese Office Action mailed Aug. 22, 2012 in corresponding Japanese Application No. 2008-305018.

* cited by examiner

*Primary Examiner* — Hung T. Nguyen
(74) *Attorney, Agent, or Firm* — Staas & Halsey LLP

(57) ABSTRACT

An image processing apparatus, includes: a state information unit obtaining state information that indicates a state of driving operation of the vehicle; an image storage storing a two-dimensional image data obtained from imaging devices whose viewing fields partly overlap; a specifying unit compositing the data into a shape of a three-dimensional projection plane, and then specifying, in correspondence to the state information, a compositing method overlapping portions of viewing fields to be used for transformation from a three-dimensional image into a projection image viewed from a viewpoint along a line-of-sight; and an image transformation unit transforming the data into projection image data viewed from the viewpoint along the line-of-sight direction using the compositing method.

20 Claims, 13 Drawing Sheets

IMAGE PROCESSING APPARATUS, IMAGE PROCESSING METHOD, AND RECORDING MEDIUM

CROSS-REFERENCE TO RELATED APPLICATIONS

This application is based upon and claims the benefit of priority of the prior Japanese Patent Application No. 2008-305018, filed on Nov. 28, 2008, the entire contents of which are incorporated herein by reference.

FIELD

The embodiments discussed herein are related to an image processing apparatus, an image processing method, and a recording medium performing with surroundings image of a vehicle through a plurality of imaging devices mounted on the vehicle.

BACKGROUND

As an apparatus assisting the driving of a vehicle such as an automobile, a vehicle-mounted camera obtaining an image of a range including the dead area from a driver's viewing field and a vehicle-mounted monitor displaying an image obtained by the vehicle-mounted camera are used. For example, a camera is attached to the rear face of the vehicle. Then, an image obtained by image obtaining of the field behind the vehicle is displayed on a vehicle-mounted monitor. This allows the driver to drive the vehicle into the garage with checking the field behind the vehicle on the basis of the image displayed on the vehicle-mounted monitor. Further, a camera is attached to the front face of the vehicle. Then, an image obtained by image obtaining of the field in the left and right front of the vehicle is displayed on a vehicle-mounted monitor. This allows the driver to check the presence of children, obstacles, and the like around the vehicle at a crossing or the like on the basis of the image displayed on the vehicle-mounted monitor.

In such a driving assistance apparatus, a plurality of cameras are mounted on the vehicle. Then, the image from each camera is switched and displayed. Alternatively, the images from the plurality of cameras are composited and displayed. This expands the field checked by the driver on the basis of the image displayed on the vehicle-mounted monitor. According to Japanese Laid-open Patent Publication No. 2007-36668, an apparatus has been proposed in which images from cameras attached in the front, rear, left, and right of a vehicle are composited so that the entire surroundings of the vehicle is displayed on a vehicle-mounted monitor. Such an apparatus allows the driver to check at once the entire situation around the vehicle on the basis of the image displayed on the vehicle-mounted monitor. This reduces an influence to driver's driving operation caused by the driver's operation of checking the vehicle-mounted monitor.

As described above, when images obtained by a plurality of cameras are to be composited, the cameras are arranged such that their viewing fields partly overlap with each other. Then, in the overlapping fields obtained by a plurality of cameras, the images obtained by the cameras are composited. Here, a seam of images arises in the compositing position where the plurality of images are composited. In the field near such a seam, discontinuity in the image may be caused by a difference in the viewpoint of each camera. This discontinuity may generate a situation that an intrinsically present obstacle is not detected on the image data.

In order to resolve such a problem, an apparatus has been proposed in which the compositing position used at the time of compositing a plurality of images is variable. Nevertheless, in such an apparatus, only a few kinds of compositing position patterns are prepared. Then, in many cases, the compositing position pattern is switched when a given condition is satisfied. Thus, when the compositing position of the image is switched, the display image is changed. This causes in some cases a rapid change in the manner that the object in the display image is seen and there is a possibility that the driver gets confused.

SUMMARY

According to an aspect of the embodiments, an image processing apparatus processing image data obtained by surroundings image of a vehicle through a plurality of imaging devices mounted on the vehicle includes: a state information obtaining unit obtaining state information that indicates a state of driving operation of the vehicle; an image storage unit storing a plurality of two-dimensional image data pieces obtained from the plurality of imaging devices whose viewing fields partly overlap with each other; a specifying unit compositing a plurality of two-dimensional image data pieces into a shape of a three-dimensional projection plane when the state information obtaining unit has obtained given state information, and then specifying, in correspondence to the state information, a compositing method for overlapping portions of viewing fields or transformation information to be used for transformation from a three-dimensional image based on the obtained three-dimensional image data into projection image data viewed from a position of a given viewpoint along a given line-of-sight direction; and an image transformation unit transforming the plurality of two-dimensional image data pieces stored in the image storage unit into projection image data viewed from the position of the given viewpoint along the given line-of-sight direction, by using the compositing method or the transformation information specified by the specifying unit.

The object and advantages of the invention will be realized and attained by the elements and combinations particularly pointed out in the claims. It is to be understood that both the foregoing general description and the following detailed description are exemplary and explanatory and are not restrictive of the embodiment, as claimed.

DESCRIPTION OF EMBODIMENTS

The present application has been made in view of this situation. An object of the present application is to provide an image processing apparatus, an image processing method, and a recording medium providing an easily recognizable image without generating a rapid change.

An image processing apparatus, an image processing method, and a recording medium disclosed in the present application are described below in detail with reference to the drawings illustrating embodiments. The following description is given for an image processing system in which an image processing apparatus, a camera (imaging device), and a display device disclosed in the present application are mounted in a vehicle such as an automobile.

Embodiment 1

Figure 1:
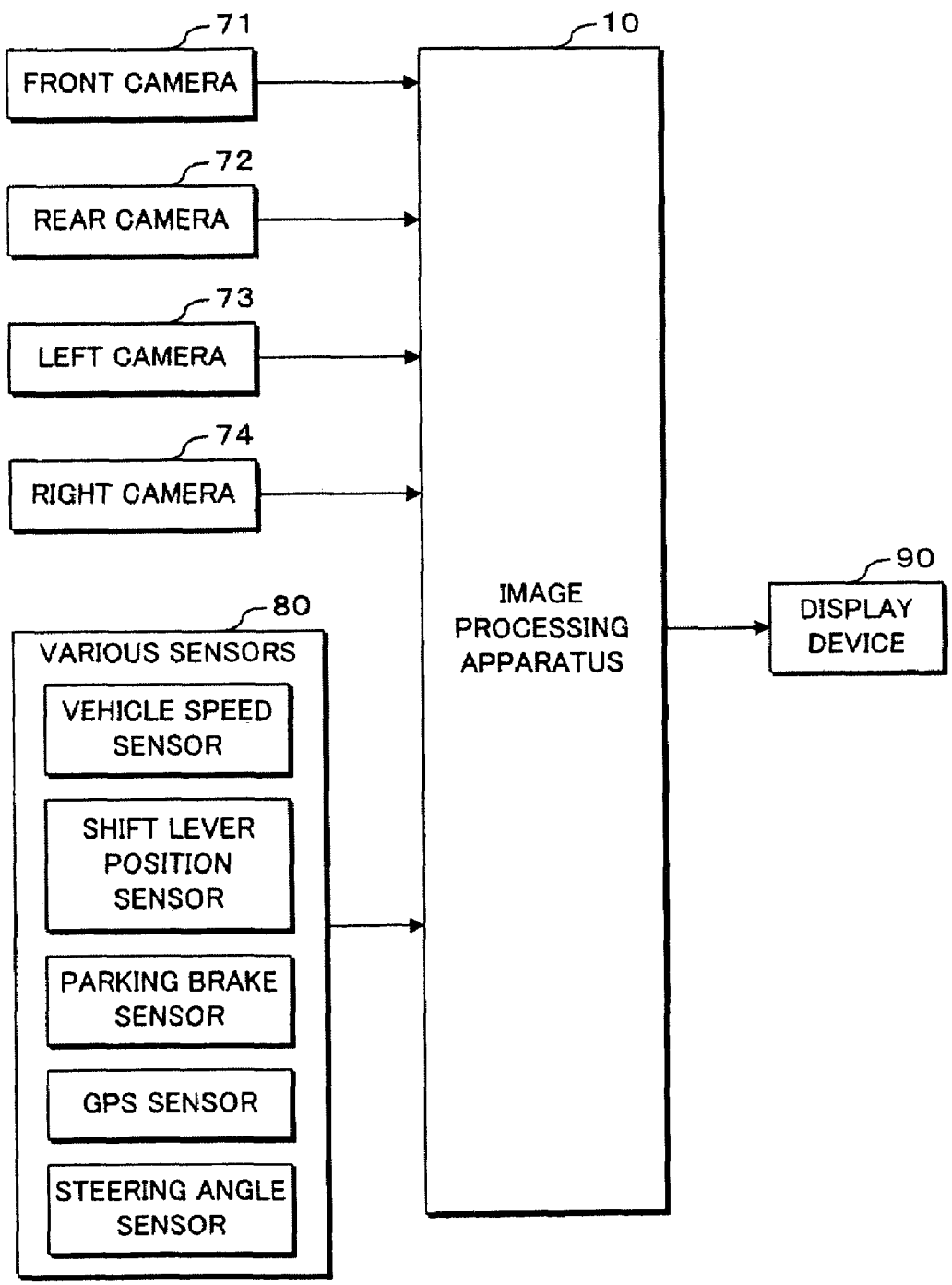
FIG. 1 is a block diagram illustrating an image processing system according to Embodiment 1.

An image processing system according to Embodiment 1 is described below. FIG. 1 is a block diagram illustrating an image processing system according to Embodiment 1. In the image processing system according to Embodiment 1, an image processing apparatus 10 is connected to four cameras 71, 72, 73, and 74, various sensors 80, and a display device 90. The image processing apparatus 10, the cameras 71, 72, 73, and 74, the various sensors 80, and the display device 90 may be connected to each other through dedicated cables, or alternatively through a vehicle-mounted LAN (Local Area Network) built inside the vehicle.

The cameras 71, 72, 73, and 74 employ image sensors such as CCD (Charge Coupled Device) and CMOS (Complementary Metal Oxide Semiconductor) and obtain, for example, 30 image frames (image data) per second. The cameras 71, 72, 73, and 74 perform sequential analog-to-digital conversion of the obtained analog image data into digital image data, and then sequentially output the obtained digital image data to the image processing apparatus 10.

The display device 90 is, for example, a liquid crystal display. The image data obtained by the cameras 71, 72, 73, and 74 and having undergone given processing in the image processing apparatus 10 is sequentially displayed on the display unit 90.

The various sensors 80 are, for example, a vehicle speed sensor, a shift lever position sensor, a parking brake sensor, a GPS (Global Positioning System) sensor, and a steering angle sensor. The vehicle speed sensor is a sensor for detecting the running speed of the vehicle. The shift lever position sensor is a sensor for detecting the operating position of the shift lever provided in the vehicle. The parking brake sensor is a sensor for detecting whether the parking brake is applied (ON or OFF). The steering angle sensor is a sensor for detecting the rotation angle, relative to the direction of forward movement, of the wheels that rotate in the contact position with the ground surface in accordance with revolution of the steering wheel provided in the vehicle.

The GPS sensor is a sensor that has an antenna for receiving radio waves (GPS signals) transmitted from a plurality of GPS satellites and that detects the location (current position) on the basis of the received GPS signals. Here, the GPS sensor (position acquisition unit) acquires the detected current position in the form of position information containing data concerning the latitude, the longitude, and the altitude. The various sensors 80 sequentially output to the image processing apparatus 10 the detection signals obtained by detecting various kinds of information. Here, in addition to the sensors described above, the various sensors 80 may include a sensor for detecting the press-down amount of the access pedal and a sensor for detecting the press-down amount of the brake pedal.

Figure 2:
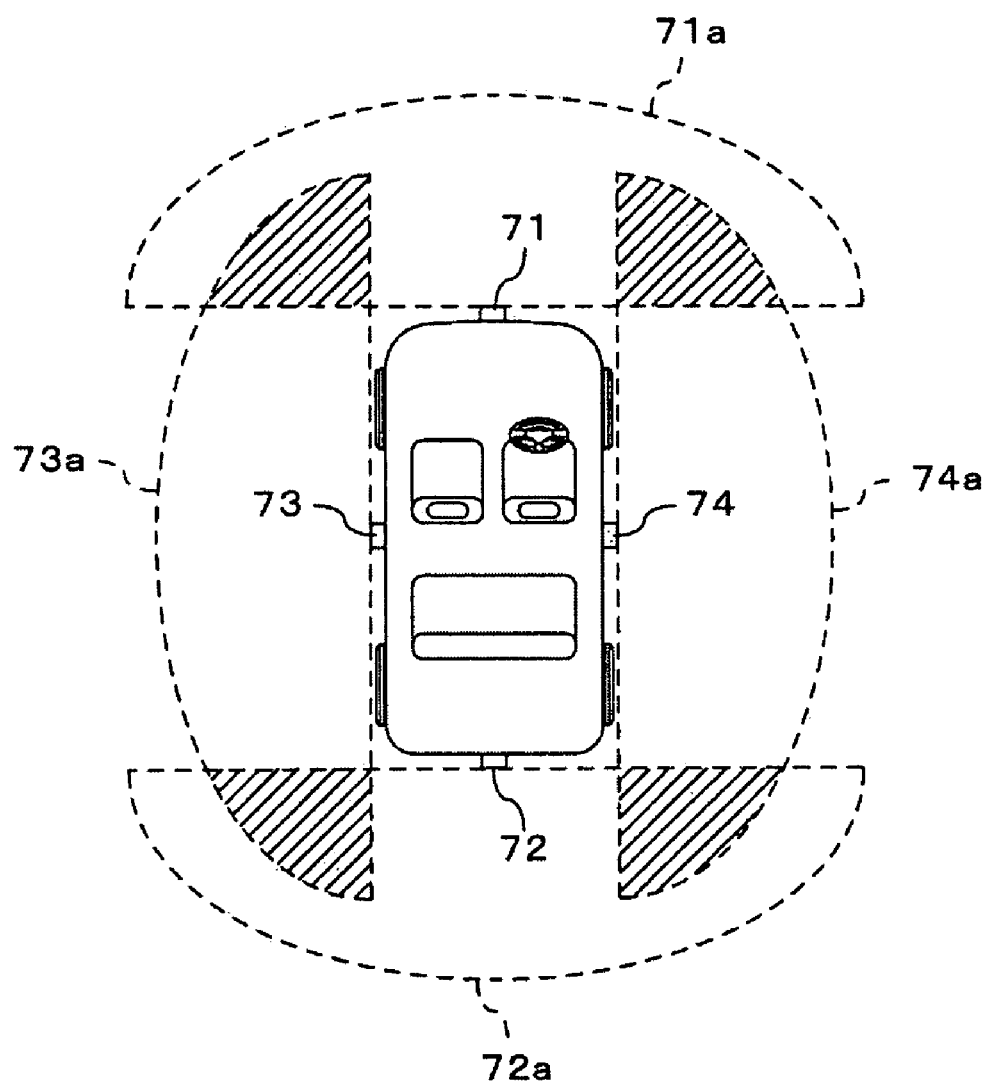
FIG. 2 is a schematic diagram illustrating an example of attaching positions of cameras to a vehicle.

FIG. 2 is a schematic diagram illustrating an example of attaching positions of the cameras 71, 72, 73, and 74 to a vehicle. FIG. 2 illustrates a situation that a vehicle provided with the image processing system is viewed from the immediate above. Further, in the vehicle illustrated in FIG. 2, the front is directed upward. As illustrated in FIG. 2, the front camera 71 is attached in the center of the front bumper provided in the vehicle, such as to take an image of the field ahead of the vehicle. The rear camera 72 is attached in the center of the rear bumper provided in the vehicle, such as to take an image of the field behind the vehicle. The left camera 73 is attached in the center of the left side-face of the vehicle relative to the forward direction, such as to take an image of the left side field of the vehicle. The right camera 74 is attached in the center of the right side-face of the vehicle relative to the forward direction, such as to take an image of the right side field of the vehicle.

Each of the cameras 71, 72, 73, and 74 is a camera employing a super-wide angle lens having a view angle of 180°. Thus, the front camera 71 takes an image of the field 71a ahead of the vehicle, while the rear camera 72 takes an image of the field 72a behind the vehicle. The left camera 73 takes an image of the field 73a on the left side of the vehicle, while the right camera 74 takes an image of field 74a on the right side of the vehicle. The cameras 71, 72, 73, and 74 are arranged such that image-taking areas (viewing fields) partly overlap with each other. Each shaded field in FIG. 2 indicates a field where the image-taking areas of two cameras overlap with each other.

The attaching positions of the cameras 71, 72, 73, and 74 are preferably the center of the front face, the rear face, the left side-face, and the right side-face of the vehicle as illustrated in FIG. 2. However, as long as the positions cause partial overlap of the image-taking areas of the cameras 71, 72, 73, and 74, the attaching positions are not limited to those described above. For example, the left camera 73 and the right camera 74 may be attached to the mirrors provided in the vehicle. Further, also the number of cameras is not limited to four, as long as the cameras are attached at positions that allow image taking of the area of 360° around the vehicle with partial overlap of the image-taking areas of the cameras.

Figure 3:
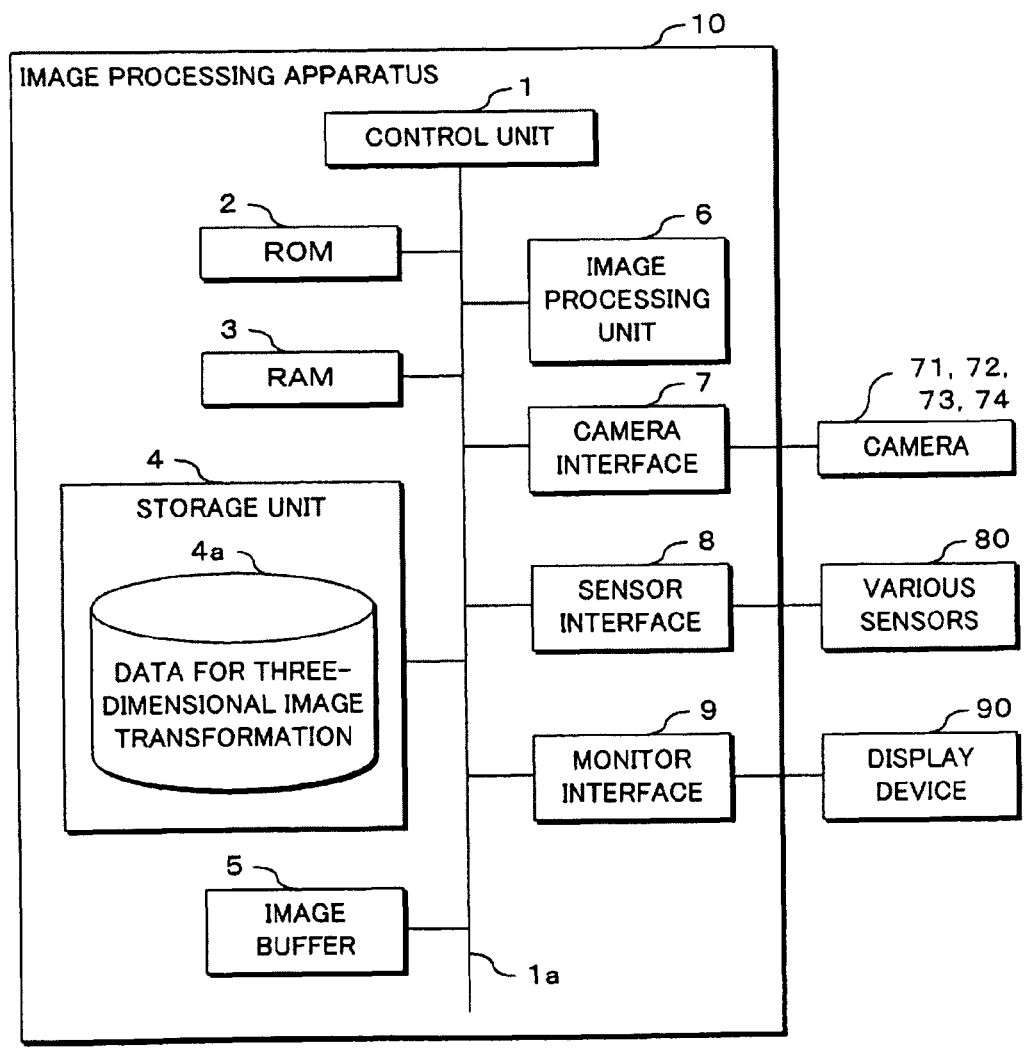
FIG. 3 is a block diagram illustrating an image processing apparatus according to Embodiment 1.

FIG. 3 is a block diagram illustrating the image processing apparatus 10 according to Embodiment 1. The image processing apparatus 10 according to Embodiment 1 includes a control unit 1, a ROM (Read Only Memory) 2, a RAM (Random Access Memory) 3, a storage unit 4, an image buffer 5, an image processing unit 6, a camera interface 7, a sensor interface 8, and a monitor interface 9. These hardware units are connected to each other through a bus 1a.

The control unit 1 is a CPU (Central Processing Unit) or an MPU (Micro Processor Unit), and appropriately reads out a control program stored in advance in the ROM 2 or the storage unit 4 onto the RAM 3 and then executes it. Further, the control unit 1 controls the operation of the hardware units described above. The ROM 2 stores in advance: various control programs necessary for the operation of the image processing apparatus 10; and information concerning the attaching positions of the cameras 71, 72, 73, and 74 to the vehicle and the image taking positions. The RAM 3 is an SRAM or a flash memory, and temporarily stores various data generated at the time of execution of the control program by the control unit 1.

The storage unit 4 is a hard disk driver or a flash memory, and stores in advance: various control programs necessary for the operation of the image processing apparatus 10 and data 4a for three-dimensional image transformation.

The image buffer (image storage unit) 5 is a RAM or a flash memory, and sequentially stores image data obtained by the cameras 71, 72, 73, and 74. The image processing unit (image transformation unit) 6 performs given processing on the image data taken by the cameras 71, 72, 73, and 74 and then stored in the image buffer 5. The obtained image data is outputted to the display device 90. Here, the image processing unit 6 transforms the image data having undergone given processing, into data for display of NTSC (National Television System Committee standard) data or the like, and then outputs the obtained data for display to the display device 90. Details of the image processing performed by the image processing unit 6 are described later.

The camera interface 7 is connected to each of the cameras 71, 72, 73, and 74 through a communication line, and sequentially obtains the image data by image-taking of each of the cameras 71, 72, 73, and 74. The camera interface 7 transmits the sequentially obtained image data to the image buffer 5, so as to store the data into the image buffer 5.

The sensor interface 8 is connected to each of the various sensors 80 described above through a communication line, and sequentially obtains the detection result by each of the various sensors 80. The sensor interface 8 transmits the sequentially obtained detection result to the RAM 3, so as to store the result into the RAM 3. The monitor interface (image output unit) 9 is connected to the display device 90 through a communication line. Given image processing is performed by the image processing unit 6. The obtained data for display is outputted to the display device 90.

Figure 4:
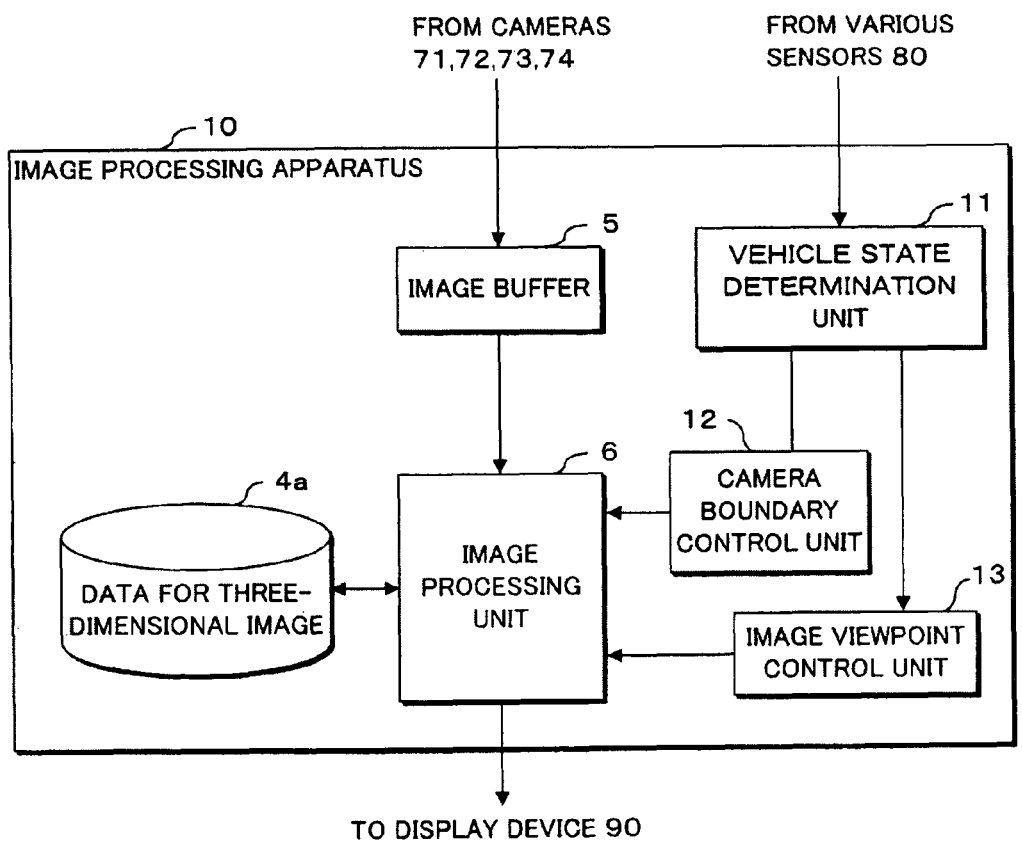
FIG. 4 is a functional block diagram illustrating a function of an image processing apparatus according to Embodiment 1.

The function of the image processing apparatus 10 realized when the control unit 1 executes a control program stored in the ROM 2 or the storage unit 4 is described below. FIG. 4 is a functional block diagram illustrating the function of the image processing apparatus 10 according to Embodiment 1. In the image processing apparatus 10 according to Embodiment 1, when the control unit 1 executes a control program stored in the ROM 2 or the storage unit 4, the function of the vehicle state determination unit 11, the camera boundary control unit 12, the image viewpoint control unit 13, and the like is realized.

Figure 5:
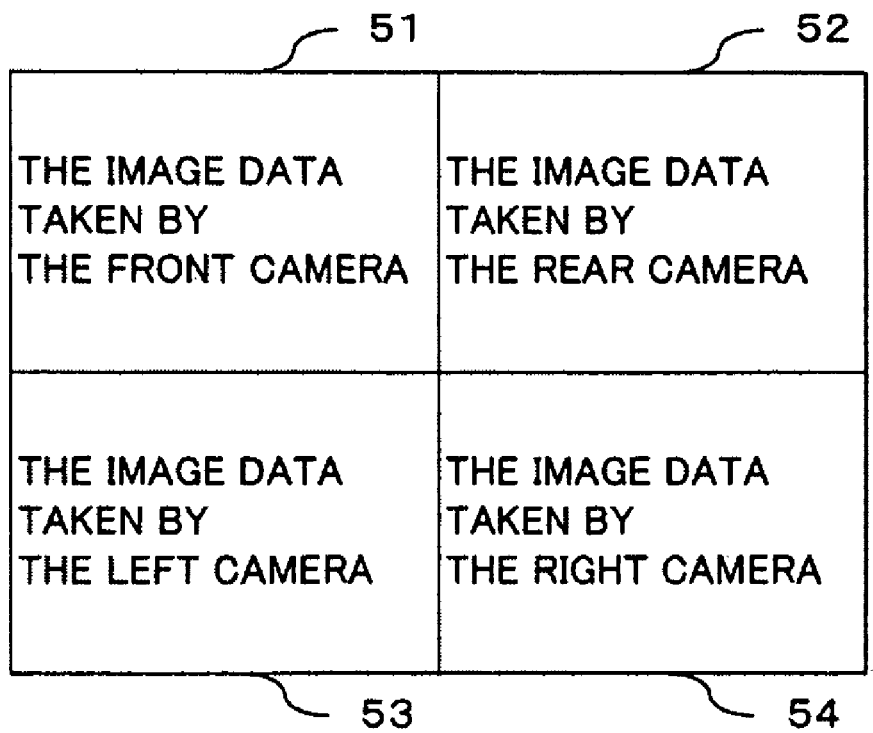
FIG. 5 is a schematic diagram illustrating an example of storage of image data performed by an image buffer.

The image processing apparatus 10 according to the Embodiment 1 sequentially stores into the image buffer 5 the image data obtained from the cameras 71, 72, 73, and 74 via the camera interface 7. FIG. 5 is a schematic diagram illustrating an example of storage of the image data performed by the image buffer 5. As illustrated in FIG. 5, the image buffer 5 is divided into four fields 51, 52, 53, and 54. In the example illustrated in FIG. 5, the image data taken by the front camera 71 is stored into the field 51, while the image data taken by the rear camera 72 is stored into the field 52. Further, the image data taken by the left camera 73 is stored into the field 53, while the image data taken by the right camera 74 is stored into the field 54.

The image processing unit 6 has, for example: a memory storing OpenGL (Open Graphics Library) which is a library for generation and display of three-dimensional image data; and an arithmetic circuit processing three-dimensional image data at a high speed (both not illustrated). First, by using the data 4a for three-dimensional image transformation, the image processing unit 6 composites the four image data pieces stored in the image buffer 5, so as to generate three-dimensional image data.

Figure 6A:
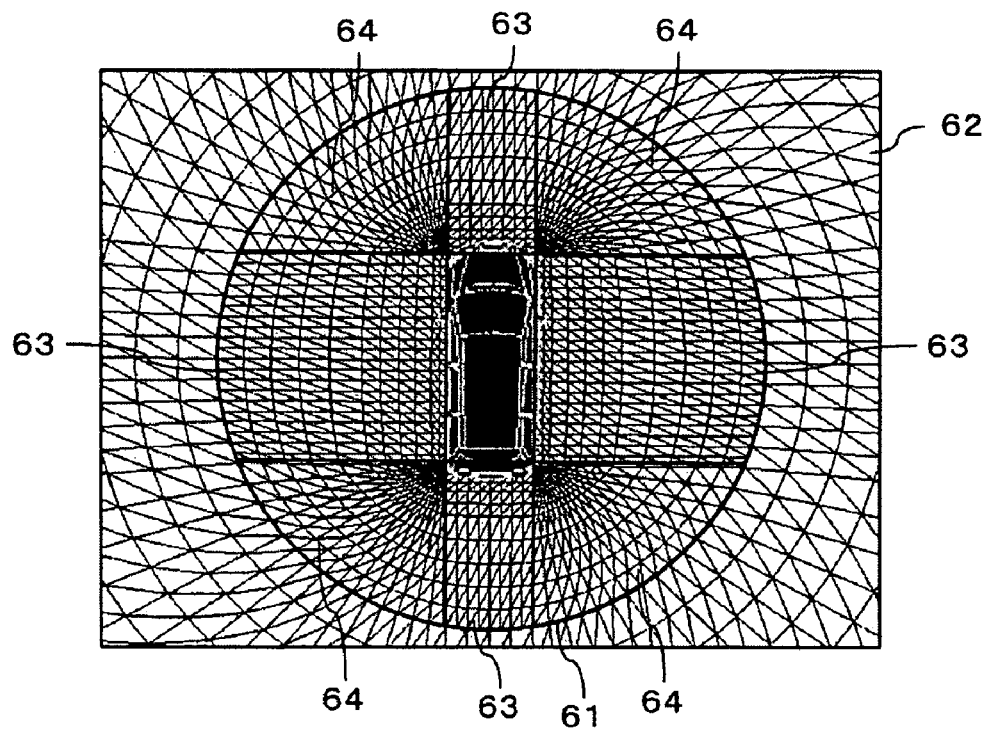
FIGS. 6A and 6B are schematic diagrams illustrating an example of data for three-dimensional image transformation.
Figure 6B:
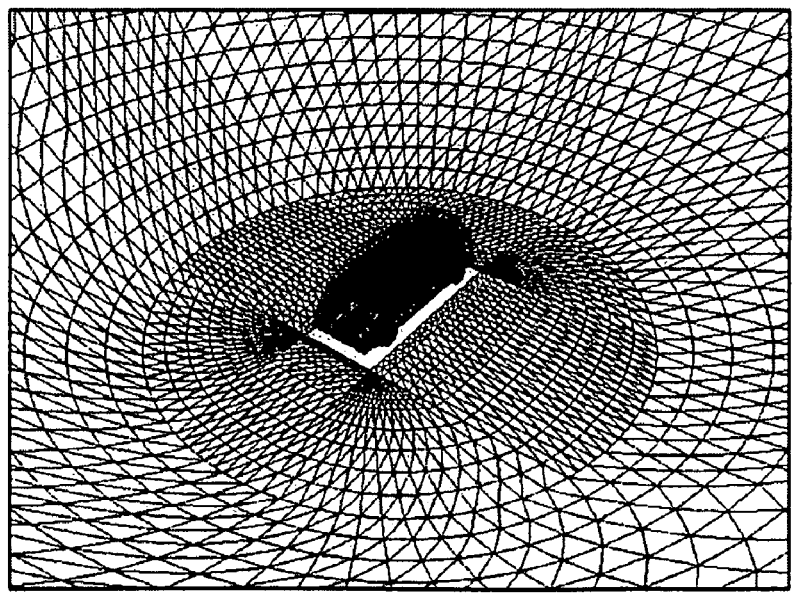

FIGS. 6A and 6B are schematic diagrams illustrating an example of the data 4a for three-dimensional image transformation. FIG. 6A is a diagram viewed from the immediate above of the vehicle. FIG. 6B is a diagram viewed from oblique above of the forward left of the vehicle. Here, description of numerals like those in FIG. 6A is omitted in FIG. 6B. For example, as illustrated in FIGS. 6A and 6B, the data 4a for three-dimensional image transformation contains a three-dimensional model used at the time of compositing the image data obtained by the cameras 71, 72, 73, and 74 into three-dimensional image data; and vehicle data used for displaying the vehicle as a three-dimensional image.

As illustrated in FIGS. 6A and 6B, the three-dimensional model contains: plane image data that indicates a circular plane 61 extending from a rectangular arrangement plane in which the vehicle is arranged; and curved surface image data that indicates a curved surface 62 extending from the plane. Further, the plane image data contains: rectangular extended surface data that indicates four rectangular extended surfaces 63, 63, . . . each having an approximately rectangular shape extending from each side of the arrangement plane; and sector extended surface data that indicates four sector extended surfaces 64, 64, . . . each having a sector shape extending from each vertex of the arrangement plane. The rectangular extended surface data is data of a plurality of polygons arranged from each side of the arrangement plane of the vehicle along the extension direction of the rectangular extended surface 63, 63, . . . . The sector extended surface data is data of a plurality of polygons arranged radially from each vertex of the arrangement plane of the vehicle. The vehicle data is vehicle image data used for displaying the vehicle provided with the image processing apparatus 10 according to Embodiment 1, and is different for each type of the vehicle.

The image processing unit 6 performs texture mapping processing of pasting the four image data pieces stored in the image buffer 5 in a state illustrated in FIG. 5 onto each polygon of the three-dimensional model illustrated in FIGS. 6A and 6B. Thus, the image data stored in the image buffer 5 is used as texture map patterns to be pasted onto the three-dimensional model. The image processing unit 6 performs the texture mapping processing so as to composite the four two-dimensional image data pieces into a three-dimensional image data piece.

Figure 7A:
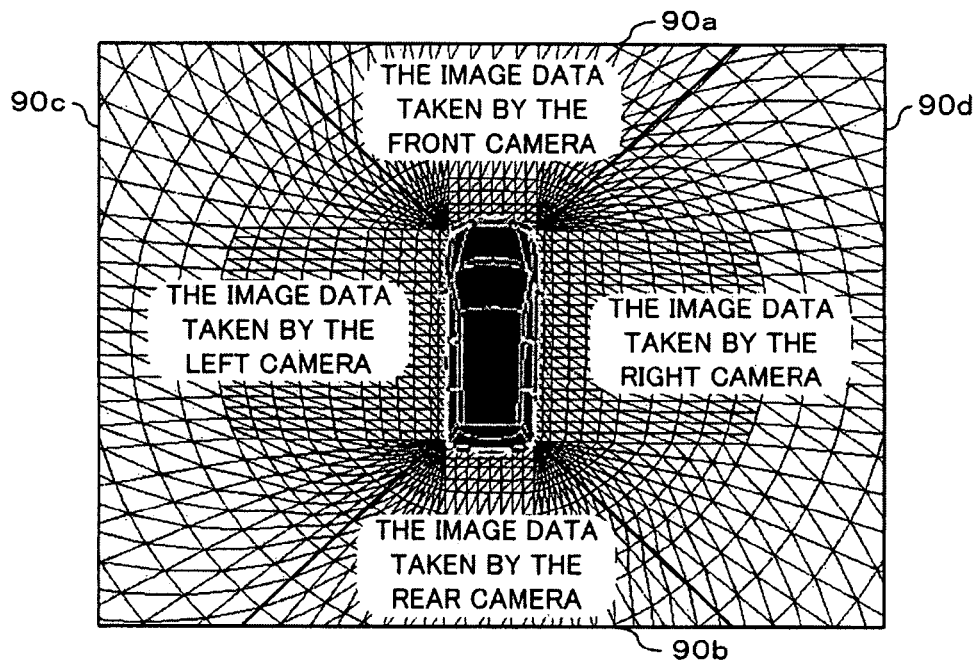
FIGS. 7A and 7B are schematic diagrams for describing texture mapping processing.
Figure 7B:
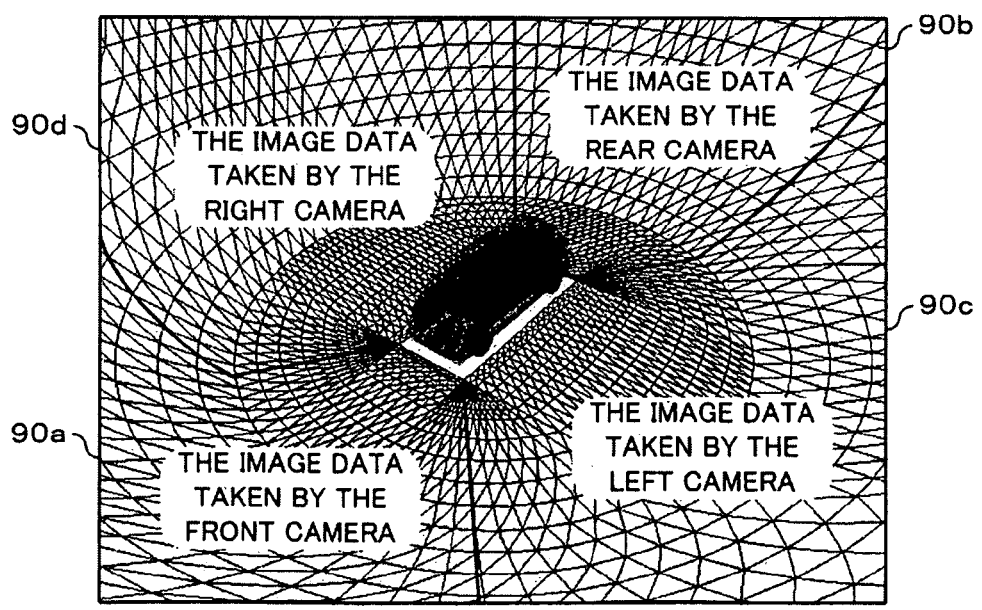

FIGS. 7A and 7B are schematic diagrams for describing the texture mapping processing. FIG. 7A is a diagram viewed from the immediate above of the vehicle. FIG. 7B is a diagram viewed from oblique above of the forward left of the vehicle. The image processing unit 6 maps the image data taken by the front camera 71 and stored in the field 51 of the image buffer 5 onto the field 90a ahead of the vehicle as illustrated in FIGS. 7A and 7B. Further, the image processing unit 6 maps the image data taken by the rear camera 72 and stored in the field 52 of the image buffer 5 onto the field 90b behind the vehicle as illustrated in FIGS. 7A and 7B.

Similarly, the image processing unit 6 maps the image data taken by the left camera 73 and stored in the field 53 of the image buffer 5 onto the field 90c on the left side of the vehicle as illustrated in FIGS. 7A and 7B. The image processing unit 6 maps the image data taken by the right camera 74 and stored in the field 54 of the image buffer 5 onto the field 90d on the right side of the vehicle as illustrated in FIGS. 7A and 7B.

Then, the image processing unit 6 transforms the three-dimensional image data generated by the texture mapping processing into two-dimensional projection image data viewed from a given viewpoint. Here, FIGS. 6A and 7A are projection images whose viewpoint is the immediate above of the vehicle, while FIGS. 6B and 7B are projection images whose viewpoint is oblique above of the forward left of the vehicle.

Then, the image processing unit 6 transforms the generated projection image data into data for display on the display device 90, and then outputs the data to the display device 90 via the monitor interface 9. Here, the processing of transforming the projection image data into the data for display may be performed by the image processing unit 6 or alternatively the display device 90. Alternatively, this processing may be performed by any unit other than the image processing unit 6 and the display device 90.

As described above, the parameters used in the image processing that the image processing unit 6 generates a projection image data piece from the four two-dimensional image data pieces are variable within a given range. The parameters include: information that indicates the compositing position of the four two-dimensional image data pieces used when the four two-dimensional image data pieces are composited into a shape of a three-dimensional projection plane so that a three-dimensional image data piece is generated; and information that indicates the position of the viewpoint and the line-of-sight direction used when projection image data is generated from the three-dimensional image data. In the image processing apparatus 10 according to Embodiment 1, these parameters are changed in accordance with the running state of the vehicle.

Here, the compositing position (boundary position angle, hereinafter) of the two-dimensional image data is controlled by the camera boundary control unit 12 described later. The position (viewpoint position angle, hereinafter) of the viewpoint is controlled by the image viewpoint control unit 13 described later. Further, the image processing apparatus 10 according to Embodiment 1 adopts as the running state the running speed during the forward movement and the running speed during the backward movement. However, these are not restrictive.

Figure 8A:
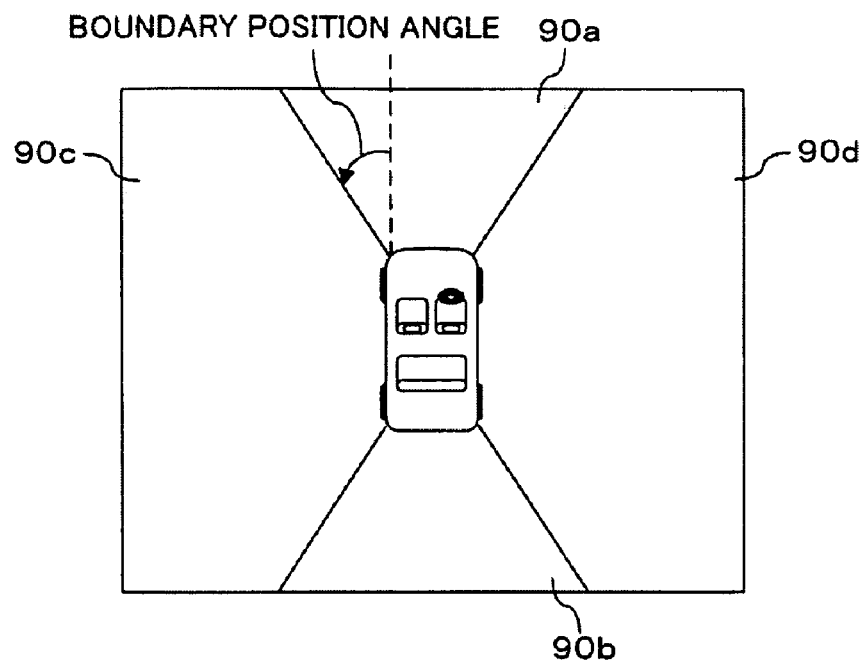
FIGS. 8A and 8B are schematic diagrams for describing boundary position angles and viewpoint position angles.
Figure 8B:
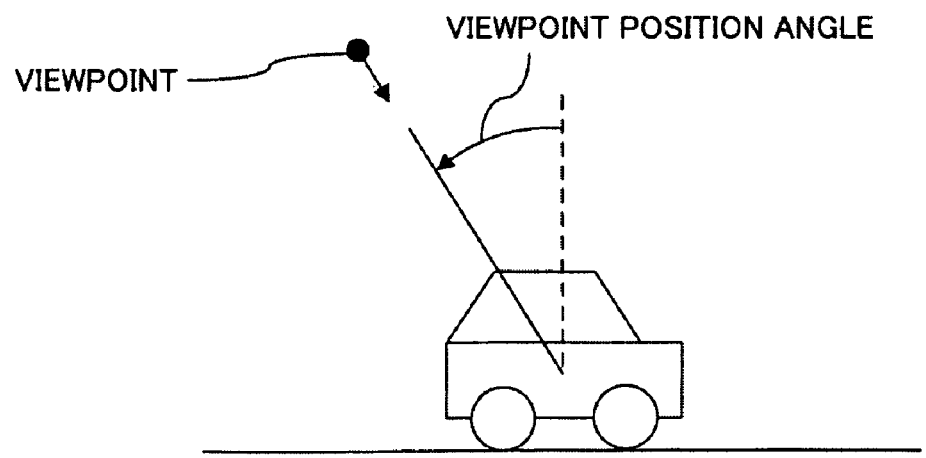

FIGS. 8A and 8B are schematic diagrams for describing the boundary position angles and the viewpoint position angles. FIG. 8A is a schematic diagram for describing the boundary position angle. FIG. 8B is a schematic diagram for describing the viewpoint position angle. In FIG. 8A, the image data taken by the front camera 71 is pasted in the field 90a, while the image data taken by the rear camera 72 is pasted in the field 90b. Further, the image data taken by the left camera 73 is pasted in the field 90c, while the image data taken by the right camera 74 is pasted in the field 90d.

In Embodiment 1, the boundary position angle as illustrated in FIG. 8A is set up as the compositing position at the time of compositing the four two-dimensional image data pieces into a three-dimensional image data piece. The boundary position angle is set up within a range of 5° to 85° relative to the dashed line illustrated in FIG. 8A. Here, it is preferable that the four two-dimensional image data pieces are composited on the radially extending surface 64, 64, . . . illustrated in FIG. 6A. Thus, the boundary position angle is not limited to 5° to 85°, and may be 0° to 90° or the like as long as adjacent two-dimensional image data pieces overlap with each other.

Further, in Embodiment 1, the set-up boundary position angle causes a change not only in the boundary position of the field 90a and field 90c but also in the boundary position of the field 90a and the field 90d, the boundary position of the field 90d and the field 90b, and the boundary position of the field 90b and the field 90c. Here, the boundary position of the field 90a and the field 90c, the boundary position of the field 90a and the field 90d, the boundary position of the field 90d and the field 90b, and the boundary position of the field 90b and the field 90c may be set up independently.

Figure 9A:
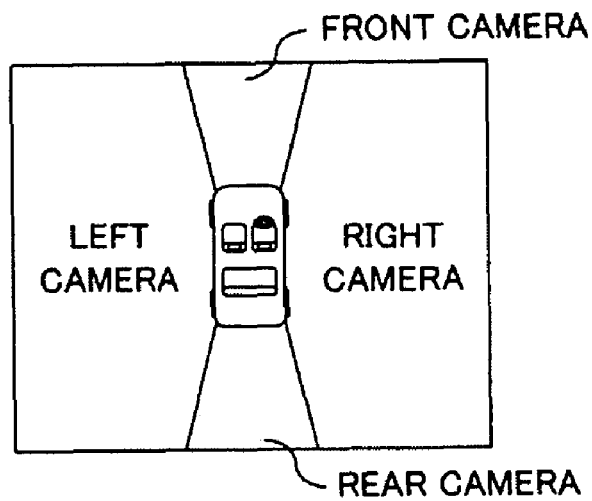
FIGS. 9A, 9B, and 9C are schematic diagrams for describing differences in boundary position angles.
Figure 9B:
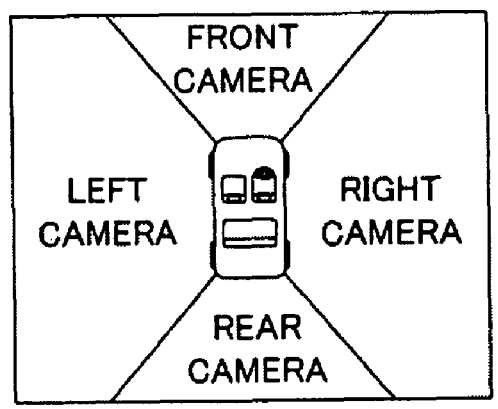
Figure 9C:
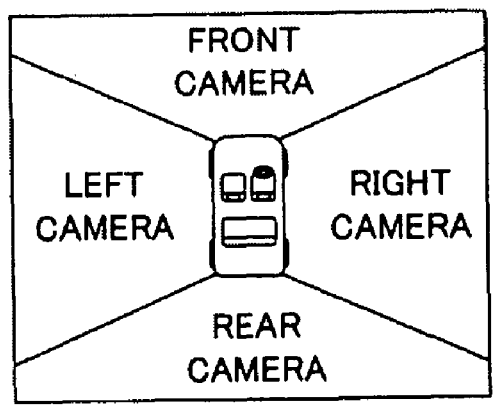

FIGS. 9A, 9B, and 9C are schematic diagrams for describing differences in the boundary position angle. FIG. 9A illustrates three-dimensional image data in a case that the boundary position angle is set at approximately 15°. FIG. 9B illustrates three-dimensional image data in a case that the boundary position angle is set at approximately 40°. FIG. 9C illustrates three-dimensional image data in a case that the boundary position angle is set at approximately 70°. As illustrated in FIGS. 9A, 9B, and 9C, with decreasing boundary position angle, the images taken by the left camera 73 and the right camera 74 are closed up further. In contrast, with increasing boundary position angle, the images taken by the front camera 71 and the rear camera 72 are closed up further.

Further, in Embodiment 1, the viewpoint position angle as illustrated in FIG. 8B is set up as the position of the viewpoint at the time of generating projection image data from three-dimensional image data. The viewpoint position angle is changed within a range of 0 to 60° behind the vehicle relative to the vertical direction indicated by the dashed line in FIG. 8B. Here, although not illustrated in FIG. 8B, in Embodiment 1, the change may be within a range of 0° to 60° from the immediate above of the vehicle (vertical direction indicated by a dashed line) to the ahead of the vehicle. In this case, the viewpoint position angle is expressed by 0° to −60°. Further, the position of the viewpoint may be moved not only in the front and rear directions of the vehicle with reference to the immediate above direction of the vehicle but also in the left and right directions of the vehicle.

Figure 10A:
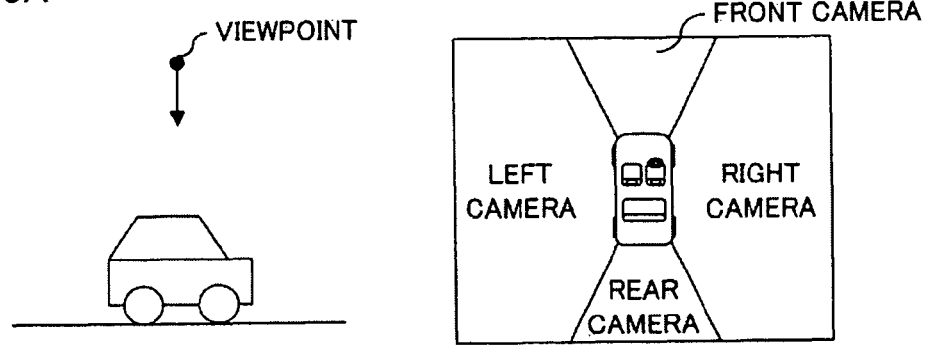
FIGS. 10A, 10B, and 10C are schematic diagrams for describing differences in viewpoint position angles.
Figure 10B:
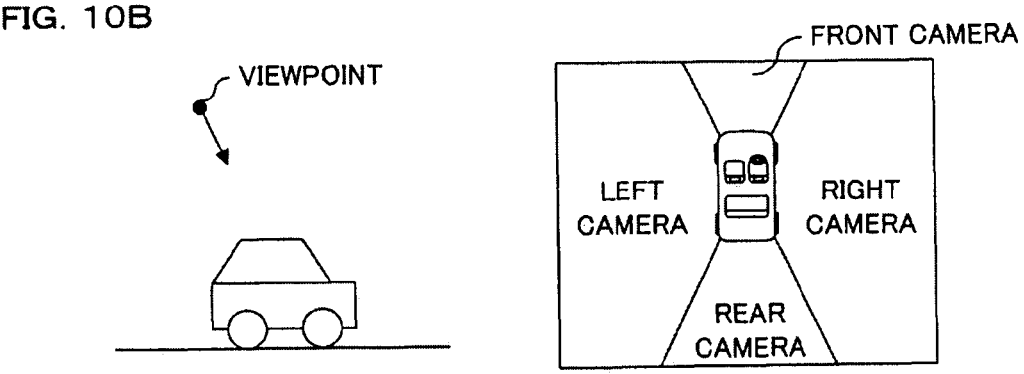
Figure 10C:
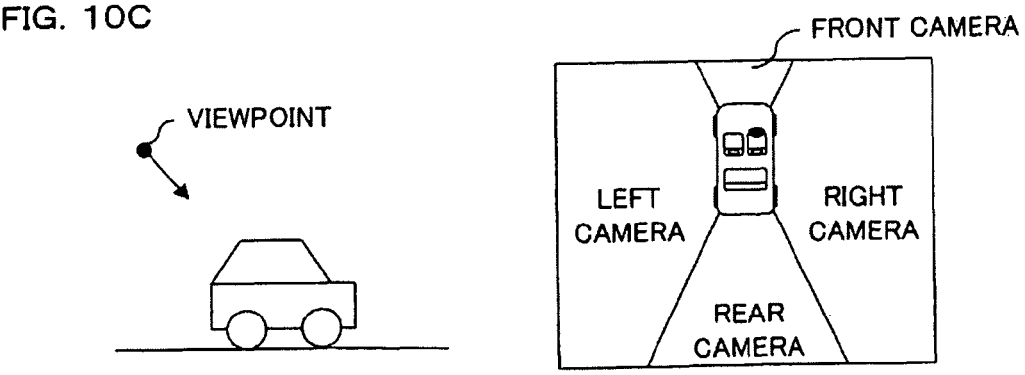

FIGS. 10A, 10B, and 10C are schematic diagrams for describing differences in the viewpoint position angles. FIG. 10A illustrates three-dimensional image data in a case that the viewpoint position angles are set at 0°. FIG. 10B illustrates three-dimensional image data in a case that the viewpoint position angles are set at approximately 15°. FIG. 10C illustrates three-dimensional image data in a case that the viewpoint position angles are set at approximately 45°. As illustrated in FIGS. 10A, 10B, and 10C, with increasing viewpoint position angle, the image taken by the rear camera 72 is closed up further than the image taken by the front camera 71.

The image processing unit 6 according to Embodiment 1 acquires the boundary position angle and the viewpoint position angle which are variable as described above, from the camera boundary control unit 12 and the image viewpoint control unit 13 described later. On the basis of the boundary position angle obtained from the camera boundary control unit 12, the image processing unit 6 calculates that each image element data piece in each image data piece stored in the image buffer 5 as illustrated in FIG. 5 is pasted onto which polygon of each of the fields 90a, 90b, 90c, and 90d illustrated in FIG. 7. Then, on the basis of the calculation result, the image processing unit 6 composites the image data pieces stored in the image buffer 5, so as to generate three-dimensional image data.

Further, the image processing unit 6 according to Embodiment 1 transforms the generated three-dimensional image data into projection image data viewed from the viewpoint indicated by the viewpoint position angle obtained from the image viewpoint control unit 13. The image processing unit 6 outputs the generated projection image data to the display device 90.

The vehicle state determination unit 11 obtains detection signals from the various sensors 80 via the sensor interface 8, and then on the basis of the obtained detection signals, determines the state of the vehicle which varies continuously. Specifically, when a detection signal is obtained from the vehicle speed sensor, the vehicle state determination unit (state information obtaining unit) 11 detects the running speed (running state information) of the vehicle on the basis of the obtained detection signal. When the running speed is detected, the vehicle state determination unit 11 calculates the percentage (%) of the detected running speed with assigning that 20 km/h is 100%. Then, the vehicle state determination unit 11 notifies the calculated percentage of the running speed to the camera boundary control unit 12 and the image viewpoint control unit 13. Here, when the detected running speed is 20 km/h or higher, the vehicle state determination unit 11 notifies a percentage of 100% to the camera boundary control unit 12 and the image viewpoint control unit 13.

Further, when a detection signal is obtained from the shift lever position sensor, the vehicle state determination unit 11 determines the position of the gear wheel. When the detection signal is obtained from the parking brake sensor, the vehicle state determination unit 11 determines whether the parking brake is applied. When it is determined that the parking brake is applied, the vehicle state determination unit 11 notifies to the camera boundary control unit 12 and the image viewpoint control unit 13 that the vehicle is in a parking state. Further, when it is determined that the parking brake is not applied and that a position of shift lever is reverse (R), the vehicle state determination unit 11 determines that the vehicle is in a state of backward running. Then, the vehicle state determination unit 11 notifies to the camera boundary control unit 12 and the image viewpoint control unit 13 that the vehicle is in a state of backward running.

Further, when it is determined that the parking brake is not applied and that the position of the shift lever is not reverse (R), the vehicle state determination unit 11 determines that the vehicle is in a state of forward running. Then, the vehicle state determination unit 11 notifies to the camera boundary control unit 12 and the image viewpoint control unit 13 that the vehicle is in a forward running state.

In response to the state information transmitted from the vehicle state determination unit 11 on necessary occasions, the camera boundary control unit (specifying unit) 12 determines the boundary position angle to be used when the image processing unit 6 composites the four two-dimensional image data pieces so as to generate one three-dimensional image data piece, and then transmits the data to the image processing unit 6. Specifically, the camera boundary control unit 12 calculates a boundary position angle corresponding to the percentage of the running speed notified from the vehicle state determination unit 11, and then transmits the result to the image processing unit 6. More specifically, on the basis of the percentage Vp (%) of the running speed obtained from the vehicle state determination unit 11, the camera boundary control unit 12 calculates the boundary position angle according to the following Formula 1. As above, the camera boundary control unit 12 calculates the boundary position angle of a magnitude proportional to the running speed of the vehicle, and hence calculates a boundary position angle that follows continuously the increase or decrease of the running speed.

$$\text{Boundary position angle (°)} = (85-5) \times Vp/100 + 5 \quad \text{(Formula 1)}$$

As a result, with increasing running speed of the vehicle, three-dimensional image data in which the image data obtained by the front camera 71 and the rear camera 72 is displayed with increasing priority than the image data taken by the left camera 73 and the right camera 74 is generated by the image processing unit 6. In contrast, with decreasing running speed of the vehicle, three-dimensional image data in which the image data taken by the left camera 73 and the right camera 74 is displayed with increasing priority than the image data obtained by the front camera 71 and the rear camera 72 is generated by the image processing unit 6.

Here, both in a case that the vehicle is in a forward running state and in a case that the vehicle is in a backward running state, the camera boundary control unit 12 according to Embodiment 1 calculates the boundary position angle by using the above-mentioned Formula 1. However, the camera boundary control unit 12 may calculate the boundary position angle by using a formula different from each other in a case that the vehicle is in a forward running state and in a case that the vehicle is in a backward running state.

On the other hand, in response to the state information transmitted from the vehicle state determination unit 11 on necessary occasions, the image viewpoint control unit (specifying unit) 13 determines the viewpoint position angle to be used when the image processing unit 6 generates the projection image data from the three-dimensional image data, and then transmits the data to the image processing unit 6. Specifically, when it is notified that the vehicle is in a backward running state, the image viewpoint control unit 13 calculates a viewpoint position angle corresponding to the percentage of the running speed notified from the vehicle state determination unit 11, and then transmits the result to the image processing unit 6. More specifically, on the basis of the percentage Vp (%) of the running speed obtained from the vehicle state determination unit 11, the image viewpoint control unit 13 calculates the viewpoint position angle according to the following Formula 2. As above, the image viewpoint control unit 13 calculates the viewpoint position angle of a magnitude proportional to the running speed of the vehicle, and hence calculates a viewpoint position angle that follows continuously the increase or decrease of the running speed.

$$\text{Viewpoint position angle (°)} = 60 \times Vp/100 \quad \text{(Formula 2)}$$

Further, when it is notified that the vehicle is in a forward running state, the image viewpoint control unit 13 calculates the viewpoint position angle corresponding to the percentage Vp (%) of the running speed notified from the vehicle state determination unit 11, by using the following Formula 3. As a result, when the vehicle is in a forward running state, three-dimensional image data in which the image data taken by the front camera 71 is displayed with higher priority than the image data obtained by the rear camera 72 is generated by the image processing unit 6. As a result, when the vehicle is in a backward running state, three-dimensional image data in which the image data taken by the rear camera 72 is displayed with higher priority than the image data obtained by the front camera 71 is generated by the image processing unit 6.

$$\text{Viewpoint position angle (°)} = -60 \times Vp/100 \quad \text{(Formula 3)}$$

As described above, the camera boundary control unit 12 and the image viewpoint control unit 13 calculate appropriately the boundary position angle and the viewpoint position angle in accordance with the information from the vehicle state determination unit 11. Further, the camera boundary control unit 12 and the image viewpoint control unit 13 transmits appropriately the calculated boundary position angle and the calculated viewpoint position angle to the image processing unit 6. Herewith, the image processing unit 6 generates three-dimensional image data and projection image data in accordance with the vehicle state. When the projection image data generated in this way is displayed on the display device 90, the driver of the vehicle easily recognizes the situation around the vehicle.

In accordance with the running state of the vehicle, the image processing apparatus 10 according to Embodiment 1 displays with priority the image taken by the cameras 71, 72, 73, and 74 whose image-taking area contains the field to be notified to the driver. Thus, the compositing position used at the time of compositing three two-dimensional image data pieces into a three-dimensional image data piece is set at a position where the deterioration of visibility is suppressed as much as possible. Similarly, since the viewpoint is set up appropriately, the field to be notified to the driver is closed up appropriately.

Figure 11:
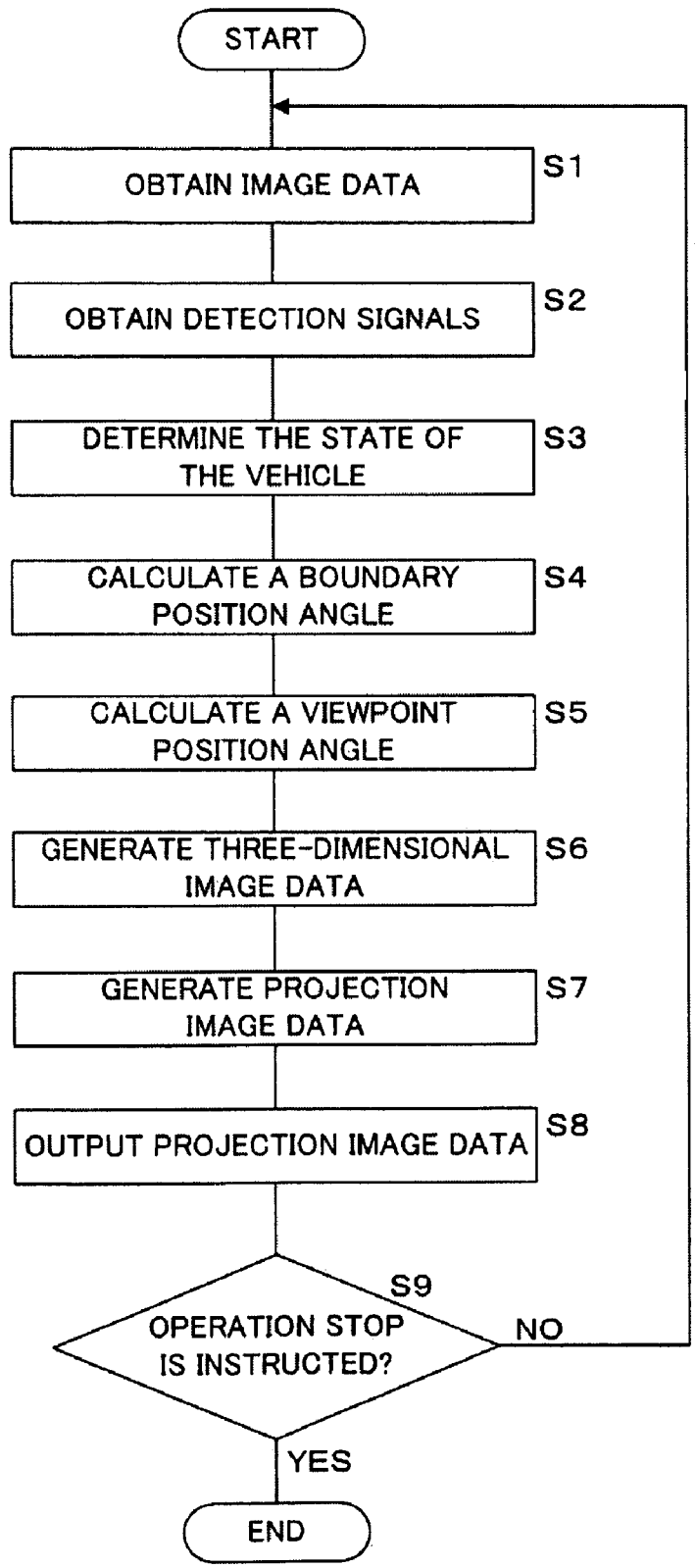
FIG. 11 is an operation chart illustrating a procedure of image processing performed by an image processing apparatus.

Image processing performed by the image processing apparatus 10 according to Embodiment 1 is described below with reference to an operation chart. FIG. 11 is an operation chart illustrating a procedure of image processing performed by the image processing apparatus 10. Here, the following processing is executed by the control unit 1 in accordance with various kinds of control programs stored in the ROM 2 or the storage unit 4 of the image processing apparatus 10.

When the power button is operated, the control unit 1 of the image processing apparatus 10 starts the hardware units provided in the image processing apparatus 10, so as to start the operation of the image processing apparatus 10. The control unit 1 obtains image data outputted from the cameras 71, 72, 73, and 74 via the camera interface 7 (at operation S1), and then stores the obtained image data into the image buffer 5. The control unit 1 (vehicle state determination unit 11) obtains detection signals from the various sensors 80 via the sensor interface 8 (at operation S2), and then determines the state of the vehicle on the basis of the obtained detection signals (at operation S3). Specifically, the control unit 1 performs, for example, the detection of the running speed of the vehicle and the determination of whether the vehicle is in a forward running state or in a backward running state.

The control unit 1 (camera boundary control unit 12) calculates a boundary position angle corresponding to the determined vehicle state (at operation S4). Further, the control unit 1 (image viewpoint control unit 13) calculates a viewpoint position angle corresponding to the determined vehicle state (at operation S5). Here, the control unit 1 may execute the processing of operation S4 and the processing of operation S5 in reversed order or in parallel.

The control unit 1 causes the image processing unit 6 to composite the four image data pieces stored in the image buffer 5 by using the boundary position angle calculated at operation S4 and the data 4a for three-dimensional image transformation, so as to generate three-dimensional image data (at operation S6). The control unit 1 causes the image processing unit 6 to generate, from the generated three-dimensional image data, two-dimensional projection image data in which the three-dimensional image based on the three-dimensional image data is viewed from the viewpoint indicated by the viewpoint position angle calculated at step S5 (at operation S7). The control unit 1 outputs the generated projection image data to the display device 90 via the monitor interface 9 (at operation S8).

The control unit 1 receives an instruction of operation stop, for example, in response to the operation of the power button performed by the driver, the passenger, or the like of the vehicle or to the operation of a button for instructing operation stop. The control unit 1 determines whether operation stop is instructed (at operation S9). When it is determined that operation stop is not instructed (at operation S9: NO), the processing is returned to operation S1. The control unit 1 repeats the processing to operations S1 to S8 described above until operation stop is instructed. When it is determined that operation stop is instructed (at operation S9: YES), the processing is stopped.

As a result of the processing described above, in the image processing apparatus 10 according to Embodiment 1, an image (video) corresponding to the running state of the vehicle is displayed on the display device 90. Thus, the driver easily recognizes the situation around the vehicle on the basis of the image corresponding to the running state of the vehicle. For example, with increasing running speed of the vehicle, the image data obtained by the front camera 71 and the rear camera 72 are displayed with increasing priority. Further, when the vehicle is in a forward running state, the viewpoint is moved toward the direction ahead of the vehicle. In contrast, when the vehicle is in a backward running state, the viewpoint is moved toward direction behind the vehicle. Thus, when the vehicle is in a backward running state, the image of the field behind the vehicle displayed with priority permits easy checking of the field behind the vehicle. Thus, children, obstacles, and the like behind the vehicle are found easily. Further, when the vehicle is in a forward running state, the image of the field ahead of the vehicle displayed with priority permits easy checking of the field ahead of the vehicle. Thus, obstacles ahead of the vehicle are easily found even when they are located distant.

In the image processing apparatus 10 according to Embodiment 1, as illustrated in FIGS. 6A, 6B, 7A, and 7B, the polygons in the rectangular extended surfaces 63, 63, . . . indicated by the rectangular extended surface data contained in the plane image data are arranged perpendicularly to the side surfaces of the vehicle. Thus, the image near the periphery of the vehicle is displayed as an image having less unnaturalness.

Further, in the image processing apparatus 10 according to Embodiment 1, the boundary position angle and the viewpoint position angle are changed continuously in accordance with the vehicle state such as the increase or decrease of the running speed. Thus, even when the boundary position angle and the viewpoint position angle are changed, the image displayed varies smoothly. Accordingly, even when the boundary position angle and the viewpoint position angle were changed rapidly, the driver would get confused is avoided in Embodiment 1. Thus, the video of the surroundings of the vehicle is displayed in a more recognizable manner, and hence the operation of the vehicle by the driver is assisted better.

Further, in the prior art, a method has been proposed in which, for example, in order that projection image data of a plurality of patterns is generated from the image data obtained by the cameras 71, 72, 73, and 74, a transformation table is prepared for each pattern. Nevertheless, in such a method, projection image data of a pattern for which a transformation table is not prepared, that is, a pattern whose viewpoint is different from those of the patterns for which a transformation table is prepared, is not generated. Further, projection image data in which the field desired to be checked by the driver in accordance with the running state of the vehicle is closed up in a more recognizable manner is not generated. Further, when a large number of transformation tables are prepared in correspondence to a large number of patterns, the capacity of the memory necessary for storing the transformation tables becomes huge. Thus, this approach is not practical. However, the image processing apparatus 10 according to Embodiment 1 resolves these problems, and displays the video of the surroundings of the vehicle in a more easily recognizable state.

Embodiment 2

Figure 12:
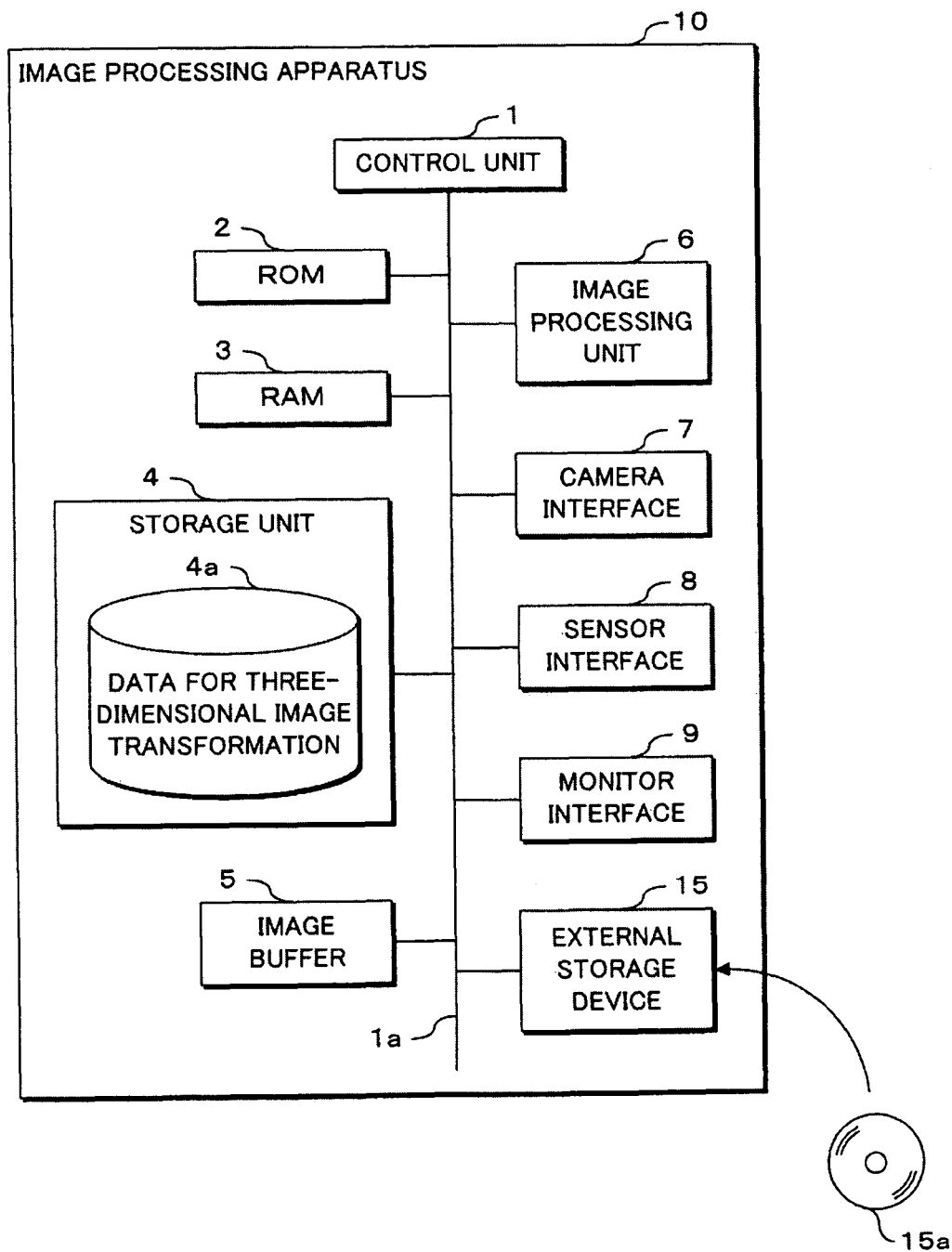
FIG. 12 is a block diagram illustrating an image processing apparatus according to Embodiment 2.

An image processing system according to Embodiment 2 is described below. FIG. 12 is a block diagram illustrating an image processing apparatus 10 according to Embodiment 2. The image processing apparatus 10 according to Embodiment 2 has an external storage device 15 in addition to the hardware units illustrated in FIG. 3. The external storage device 15 is, for example, a CD-ROM drive or a DVD drive, and reads data stored in a recording medium 15a which is a CD-ROM or a DVD-ROM.

The recording medium 15a stores a control program necessary for the operation of the image processing apparatus 10. The external storage device 15 reads the control program from the recording medium 15a, and then stores the program into the storage unit 4. The control unit 1 reads out the control program stored in the storage unit 4 onto the RAM 3, and then executes the program sequentially. As a result, the image processing apparatus 10 according to Embodiment 2 performs the processing described in the above-mentioned Embodiment 1.

The recording medium 15a may be, in addition to a CD-ROM and a DVD-ROM, any one of various kinds of recording media such as a flexible disk, a memory card, and a USB (Universal Serial Bus) memory.

Here, in a case that the image processing apparatus 10 has a communication unit for connecting with a network such as the Internet or a LAN (Local Area Network), the control program necessary for the operation of the image processing apparatus 10 may be downloaded via the network.

Embodiment 3

An image processing system according to Embodiment 3 is described below. Here, the image processing system according to Embodiment 3 is realized by including similar units to those of the image processing system according to Embodiment 1 described above. Thus, like units are designated by like numerals, and their description is omitted.

In Embodiment 1 described above, the processing has been described in which when the vehicle is moving forward or alternatively when the vehicle is moving backward, the image processing apparatus 10 generates an image corresponding to the running speed of the vehicle, and then displays the image on the display device 90. In contrast, the image processing apparatus 10 according to Embodiment 3 generates an image corresponding to the situation of the place of the vehicle.

In the image processing apparatus 10 according to Embodiment 3, in addition to the configuration in the example illustrated in FIG. 3, for example, the storage unit (map storage unit) 4 stores map data and characteristics information that indicates the characteristics of each place in the map data. The map data may be data used in a car navigation system when a car navigation system is mounted on the vehicle. The characteristics information of each place in the map data contains, for example, information that indicates whether each road is a highway or a general road and information that indicates, in case of a general road, whether the width of the road is a given value or greater. Further, the characteristics information contains: information that indicates whether each place is a location where high buildings are not present around and hence the viewing field of the surroundings is open; and information that indicates whether each place is a residential district or a business district.

When a detection signal from the GPS sensor, that is, information that indicates the current position, is obtained, the vehicle state determination unit 11 according to the Embodiment 3 acquires the characteristics information of the current position from the map data and the characteristics information stored in the storage unit 4. On the basis of the obtained characteristics information, the vehicle state determination unit 11 determines the characteristics of the current position of the vehicle, and then notifies the data to the camera boundary control unit 12 and the image viewpoint control unit 13.

When the characteristics of the current position of the vehicle are notified from the vehicle state determination unit 11, the camera boundary control unit 12 according to Embodiment 3 calculates a boundary position angle corresponding to the notified characteristics. Specifically, in the camera boundary control unit 12, a formula like the above-mentioned Formula 1 used for calculating the boundary position angle is prepared for the characteristics of each place. Thus, by using the formula corresponding to the characteristics notified from the vehicle state determination unit 11, the camera boundary control unit 12 calculates the boundary position angle corresponding to the running speed of the vehicle notified from the vehicle state determination unit 11. The camera boundary control unit 12 transmits the calculated boundary position angle to the image processing unit 6.

When the characteristics of the current position of the vehicle are notified from the vehicle state determination unit 11, the image viewpoint control unit 13 according to Embodiment 3 calculates a boundary position angle corresponding to the notified characteristics. Specifically, also in the image viewpoint control unit 13, a formula like the above-mentioned Formulas 2 and 3 used for calculating the viewpoint position angle is prepared for the characteristics of each place. Thus, by using the formula corresponding to the characteristics notified from the vehicle state determination unit 11, the image viewpoint control unit 13 calculates the viewpoint position angle corresponding to the running speed of the vehicle notified from the vehicle state determination unit 11. The image viewpoint control unit 13 transmits the calculated viewpoint position angle to the image processing unit 6.

As a result of the processing described above, the camera boundary control unit 12 and the image viewpoint control unit 13 according to Embodiment 3 calculate the boundary position angle and the viewpoint position angle in accordance not only with the running state of the vehicle but also with the characteristics of the place where the vehicle is running. Then, the image processing unit 6 performs the image processing using the boundary position angle and the viewpoint position angle, onto the image data stored in the image buffer 5. As a result, an image corresponding to the identification of the place of running is generated and displayed on the display device 90.

Thus, the driver obtains a more easily recognizable image in accordance with the situation of the present place of the vehicle. Here, also in this case, the boundary position angle and the viewpoint position angle are changed continuously in accordance with the vehicle state such as the increase or decrease of the running speed. Thus, the displayed image varies smoothly.

Embodiment 4

An image processing system according to Embodiment 4 is described below. Here, the image processing system according to Embodiment 4 is realized by including similar units to those of the image processing system according to Embodiment 1 described above. Thus, like units are designated by like numerals, and their description is omitted.

The image processing apparatus 10 according to Embodiment 4 has, as one of the various sensors 80, for example, a sensor for detecting an obstacle located in the surroundings of the vehicle. Here, as the sensor for detecting an obstacle, a sensor employing ultrasonic waves or infrared rays may be adopted. However, such a sensor is not restrictive.

When a detection signal is obtained from the obstacle detection sensor, the vehicle state determination unit 11 according to Embodiment 4 determines whether an obstacle is present in the surroundings of the vehicle. When it is determined that an obstacle is present, the position of the obstacle relative to the vehicle is detected. The vehicle state determination unit 11 notifies the position of the detected obstacle to the camera boundary control unit 12 and the image viewpoint control unit 13.

When the position of the obstacle is notified from the vehicle state determination unit 11, the camera boundary control unit 12 according to Embodiment 4 specifies a camera 71, 72, 73, or 74 whose image-taking area contains the notified position. Then, the camera boundary control unit 12 determines the boundary position angle that allows the image taken by the specified camera 71, 72, 73, or 74 to be closed up and displayed. Specifically, for example, when it is notified that an obstacle is located on the left side or the right side of the vehicle, the camera boundary control unit 12 specifies the left camera 73 or the right camera 74 as a camera whose image-taking area contains the position of the obstacle. Then, in order that the image taken by the left camera 73 or the right camera 74 having been specified are closed up and displayed, the camera boundary control unit 12 sets the boundary position angle to be a small value such as 5°.

Further, for example, when it is notified that an obstacle is located ahead of or behind the vehicle, the camera boundary control unit 12 specifies the front camera 71 and the rear camera 72 as cameras whose image-taking area contains the position of the obstacle. Then, in order that the images taken by the front camera 71 and the rear camera 72 having been specified are closed up and displayed, the camera boundary control unit 12 sets the boundary position angle to be a large value such as 85°. The camera boundary control unit 12 transmits the determined boundary position angle to the image processing unit 6.

Here, the camera boundary control unit 12 may appropriately change the value of the boundary position angle, for example, in correspondence to the distance between the vehicle and the obstacle. For example, with decreasing distance between the vehicle and the obstacle, the boundary position angle may be changed such that the image taken by the camera 71, 72, 73, or 74 whose image-taking area contains the position of the obstacle is closed up further. Specifically, values of the boundary position angle corresponding to the distance between the vehicle and an obstacle may be registered in a table in advance. Then, the camera boundary control unit 12 may refer to the table so as to determine the boundary position angle. Alternatively, the value of boundary position angle correspondence to the distance between the vehicle and an obstacle may be defined by a formula in advance. Then, by using the formula, the camera boundary control unit 12 may calculate the boundary position angle corresponding to the distance between the vehicle and the obstacle. Further, when a new obstacle is detected, the boundary position angle may be calculated such as to be changed stepwise into an angle corresponding to the position of the obstacle.

When the position of the obstacle is notified from the vehicle state determination unit 11, the image viewpoint control unit 13 according to Embodiment 4 determines a viewpoint position angle such that the viewpoint is moved in the direction of the notified position. Specifically, for example, when it is notified that an obstacle is located ahead of or behind the vehicle, the image viewpoint control unit 13 determines the viewpoint position angle such that the viewpoint is moved from the immediate above of the vehicle to the field ahead of or behind the vehicle. The image viewpoint control unit 13 transmits the determined viewpoint position angle to the image processing unit 6.

Here, the image viewpoint control unit 13 may appropriately change the value of the viewpoint position angle, for example, in correspondence to the distance between the vehicle and the obstacle. For example, with decreasing distance between the vehicle and the obstacle, the viewpoint position angle may be changed such that the viewpoint is moved toward the immediate above of the position of the obstacle. Specifically, values of the viewpoint position angle corresponding to the distance between the vehicle and an obstacle may be registered in a table in advance. Then, the image viewpoint control unit 13 may refer to the table so as to determine the viewpoint position angle. Alternatively, the value of viewpoint position angle correspondence to the distance between the vehicle and an obstacle may be defined by a formula in advance. Then, by using the formula, the image viewpoint control unit 13 may calculate the viewpoint position angle corresponding to the distance between the vehicle and the obstacle. Further, when a new obstacle is detected, the viewpoint position angle may be calculated such as to be changed stepwise into an angle corresponding to the position of the obstacle.

As a result of the processing described above, the camera boundary control unit 12 and the image viewpoint control unit 13 according to Embodiment 4 determine the boundary position angle and the viewpoint position angle in accordance with not only the running state of the vehicle but also the presence or absence of an obstacle around the vehicle. Then, the image processing unit 6 performs the image processing using the boundary position angle and the viewpoint position angle, onto the image data stored in the image buffer 5. As a result, an image corresponding to the place or the like of the obstacle located in the surroundings is generated and displayed on the display device 90. Thus, the driver obtains a more easily recognizable image in a smoothly varying state in accordance with the situation around the vehicle, and hence finds surrounding obstacles more easily.

Here, as a sensor for detecting an obstacle located in the surroundings of the vehicle, an image processing sensor may be employed. The image processing sensor detects a moving object, for example, by comparing the time series of image data taken by each of the cameras 71, 72, 73, and 74. Also when such an image processing sensor is employed, an image in which the position of the detected moving object is closed up and displayed is generated.

Further, in recent years, development of an infrastructure cooperation type system is conducted. Thus, the infrastructure cooperation type system may also be employed as means detecting the situation around the vehicle. For example, it is preferable to utilize detection signals from pedestrian detection sensors installed near a crossing or a crosswalk and detection signals from various sensors mounted on other vehicles. When the situation around the vehicle is to be detected by using the infrastructure cooperation type system, the image processing apparatus 10 has, in addition to the units in the example illustrated in FIG. 3, a receiving unit for receiving by wireless communication a detection signal from a pedestrian detection sensor or an obstacle detection sensor mounted on an other vehicle.

In this case, the vehicle state determination unit 11 obtains a detection signal from the pedestrian detection sensor or the obstacle detection sensor of an other vehicle via the receiving unit, and then on the basis of the obtained detection signal, detects the position where the pedestrian or the obstacle is located relative to the own vehicle. Then, the vehicle state determination unit 11 notifies the detected position of the pedestrian or the obstacle to the camera boundary control unit 12 and the image viewpoint control unit 13. Also in this case, an image in which the position of the pedestrian or the obstacle is closed up and displayed is generated.

Embodiment 5

An image processing system according to Embodiment 5 is described below. Here, the image processing system according to Embodiment 5 is realized by including similar units to those of the image processing system according to Embodiment 1 described above. Thus, like units are designated by like numerals, and their description is omitted.

The image processing apparatus 10 according to Embodiment 5 detects as a vehicle state the rotation angle, relative to the direction of forward movement, of the wheels rotated with revolution of the steering wheel, and then generates an image corresponding to the rotation angle. The vehicle state determination unit 11 according to Embodiment 5 obtains a detection signal, for example, from a steering angle sensor serving as one of the various sensors 80, and then on the basis of the obtained detection signal, detects the rotation angle of the wheels relative to the direction of forward movement. The vehicle state determination unit 11 notifies the detected rotation angle of the wheels to the camera boundary control unit 12 and the image viewpoint control unit 13.

When the rotation angle of the wheels is notified from the vehicle state determination unit 11, the camera boundary control unit 12 according to Embodiment 5 calculates a boundary position angle corresponding to the notified rotation angle. Specifically, for example, when the rotation angle of the wheels increases gradually, a situation is inferred that the vehicle is entering a crossing for the purpose of left or right turn. Thus, with increasing rotation angle of the wheels, the camera boundary control unit 12 calculates the boundary position angle such that the images taken by the left camera 73 and the right camera 74 are closed up further.

Further, for example, when the rotation angle of the wheels decreases gradually, a situation is inferred that the vehicle is exiting a crossing after left or right turn. Thus, with decreasing rotation angle of the wheels, the camera boundary control unit 12 calculates the boundary position angle such that the images taken by the front camera 71 and the rear camera 72 are closed up further. The camera boundary control unit 12 transmits the calculated boundary position angle to the image processing unit 6.

Here, values of the boundary position angle corresponding to the rotation angle of the wheels may be registered in a table in advance. Then, the camera boundary control unit 12 may refer to the table so as to determine the boundary position angle. Alternatively, the value of boundary position angle correspondence to the rotation angle of the wheels may be defined by a formula in advance. Then, by using the formula, the camera boundary control unit 12 may calculate the boundary position angle corresponding to the rotation angle of the wheels.

When the rotation angle of the wheels is notified from the vehicle state determination unit 11, the image viewpoint control unit 13 according to Embodiment 5 calculates the point position angle corresponding to the notified rotation angle. Specifically, for example, with increasing rotation angle of the wheels, the image viewpoint control unit 13 calculates the viewpoint position angle such that the viewpoint is moved further from the immediate above of the vehicle toward the ahead of the vehicle. Further, with decreasing rotation angle of the wheels, the image viewpoint control unit 13 calculates the viewpoint position angle such that the viewpoint is returned further toward the immediate above of the vehicle. The image viewpoint control unit 13 transmits the calculated viewpoint position angle to the image processing unit 6.

Here, values of the viewpoint position angle corresponding to the rotation angle of the wheels may be registered in a table in advance. Then, the image viewpoint control unit 13 may refer to the table so as to determine the viewpoint position angle. Alternatively, the value of viewpoint position angle correspondence to the rotation angle of the wheels may be defined by a formula in advance. Then, by using the formula, the image viewpoint control unit 13 may calculate the viewpoint position angle corresponding to the rotation angle of the wheels.

As a result of the processing described above, the camera boundary control unit 12 and the image viewpoint control unit 13 according to Embodiment 4 determine the boundary position angle and the viewpoint position angle in accordance with not only the running state of the vehicle but also the rotation angle of the wheels of the vehicle. Then, the image processing unit 6 performs the image processing using the boundary position angle and the viewpoint position angle, onto the image data stored in the image buffer 5. As a result, like in a case that the vehicle turns left or right, an image corresponding to the situation of rotation of the wheels of the vehicle is generated and displayed on the display device 90. Thus, the driver obtains a more easily recognizable image in a smoothly varying state in accordance with the running situation of the vehicle.

Embodiment 6

An image processing system according to Embodiment 6 is described below. Here, the image processing system according to Embodiment 6 is realized by including similar units to those of the image processing system according to Embodiment 1 described above. Thus, like units are designated by like numerals, and their description is omitted. The image processing apparatus 10 according to Embodiment 6 further has, as various sensors 80, for example, a sensor for detecting the press-down amount of the access pedal and a sensor for detecting the press-down amount of the brake pedal.

When a detection signal is obtained from the accelerator pedal sensor or the brake pedal sensor, the vehicle state determination unit 11 according to Embodiment 6 detects the press-down amount of the accelerator pedal or the brake pedal. The vehicle state determination unit 11 notifies the detected press-down amount of the accelerator pedal or the brake pedal to the camera boundary control unit 12 and the image viewpoint control unit 13.

When the press-down amount of the accelerator pedal or the brake pedal is notified from the vehicle state determination unit 11, the camera boundary control unit 12 according to Embodiment 6 calculates the boundary position angle corresponding to the notified press-down amount. Specifically, for example, with increasing press-down amount of the accelerator pedal, the boundary position angle is calculated such that the images taken by the front camera 71 and the rear camera 72 are closed up further. Further, for example, with increasing press-down amount of the brake pedal, the boundary position angle is calculated such that the images taken by the left camera 73 and the right camera 74 are closed up further. The camera boundary control unit 12 transmits the calculated boundary position angle to the image processing unit 6.

Here, values of the boundary position angle corresponding to the press-down amount of the accelerator pedal or the brake pedal may be registered in a table in advance. Then, the camera boundary control unit 12 may refer to the table so as to determine the boundary position angle. Further, the value of the boundary position angle corresponding to the press-down amount of the accelerator pedal or the brake pedal may be defined by a formula in advance. Then, by using the formula, the camera boundary control unit 12 may calculate the boundary position angle corresponding to the notified press-down amount.

When the press-down amount of the accelerator pedal or the brake pedal is notified from the vehicle state determination unit 11, the image viewpoint control unit 13 according to Embodiment 6 calculates the viewpoint position angle corresponding to the notified press-down amount. Specifically, for example, with increasing press-down amount of the accelerator pedal, the viewpoint position angle is calculated such that the viewpoint is moved further from the immediate above of the vehicle toward the ahead of the vehicle. Further, with increasing press-down amount of the brake pedal, the image viewpoint control unit 13 calculates the viewpoint position angle such that the viewpoint is returned further toward the immediate above of the vehicle. The image viewpoint control unit 13 transmits the calculated viewpoint position angle to the image processing unit 6.

Here, values of the viewpoint position angle corresponding to the press-down amount of the accelerator pedal or the brake pedal may be registered in a table in advance. Then, the image viewpoint control unit 13 may refer to the table so as to determine the viewpoint position angle. Further, the value of the viewpoint position angle corresponding to the press-down amount of the accelerator pedal or the brake pedal may be defined by a formula in advance. Then, by using the formula, the image viewpoint control unit 13 may calculate the viewpoint position angle corresponding to the notified press-down amount.

As a result of the processing described above, the camera boundary control unit 12 and the image viewpoint control unit 13 according to Embodiment 6 determine the boundary position angle and the viewpoint position angle corresponding to the press-down amount of the accelerator pedal or the press-down amount of the brake pedal. Then, the image processing unit 6 performs the image processing using the boundary position angle and the viewpoint position angle, onto the image data stored in the image buffer 5. As a result, an image corresponding to the running state of the vehicle depending on a change in the press-down amount of the accelerator pedal or the press-down amount of the brake pedal is generated and displayed on the display device 90. Thus, the driver obtains a more easily recognizable image in a smoothly varying state in accordance with the running situation of the vehicle.

Embodiment 7

An image processing system according to Embodiment 7 will be described below. Here, the image processing system according to Embodiment 7 is realized by including similar units to those of the image processing system according to Embodiment 1 described above. Thus, like units are designated by like numerals, and their description is omitted. The image processing apparatus 10 according to Embodiment 7 further has, as one of the various sensors 80, a sensor for detecting the direction indicated by a blinker (direction indicator).

When a detection signal is obtained from the blinker sensor, the vehicle state determination unit 11 according to Embodiment 7 determines the intended running direction of the vehicle, and then notifies the data to the camera boundary control unit 12 and the image viewpoint control unit 13.

Then the intended running direction of the vehicle is notified from the vehicle state determination unit 11, the camera boundary control unit 12 according to Embodiment 7 specifies the left camera 73 or the right camera 74 as a camera whose image-taking area contains the notified direction. Then, in order that the image taken by the left camera 73 or the right camera 74 having been specified is closed up and displayed, the camera boundary control unit 12 sets the boundary position angle to be a small value such as 5°. The camera boundary control unit 12 transmits the determined boundary position angle to the image processing unit 6.

Here, the camera boundary control unit 12 may change appropriately the value of the boundary position angle, for example, in correspondence to the time having elapsed since blinking of the blinker is started. For example, with increasing time having elapsed since the blinking start of the blinker, the boundary position angle may be changed such that the images taken by the left camera 73 and the right camera 74 are closed up further. Specifically, values of the boundary position angle corresponding to the time having elapsed since the blinking start of the blinker may be registered in a table in advance. Then, the camera boundary control unit 12 may refer to the table so as to determine the boundary position angle. Alternatively, the value of the boundary position angle corresponding to the time having elapsed since the blinking start of the blinker may be defined by a formula in advance. Then, by using the formula, the camera boundary control unit 12 may calculate the boundary position angle corresponding to the distance between the vehicle and the obstacle.

When the intended running direction of the vehicle is notified from the vehicle state determination unit 11, the image viewpoint control unit 13 according to Embodiment 7 determines a viewpoint position angle such that the viewpoint is moved to the position corresponding to the notified direction. Specifically, for example, when the left forward or the right forward is notified as the intended running direction of the vehicle, the image viewpoint control unit 13 determines the viewpoint position angle such that the viewpoint is moved from the immediate above of the vehicle to the ahead of the vehicle. The image viewpoint control unit 13 transmits the determined viewpoint position angle to the image processing unit 6.

Here, the image viewpoint control unit 13 may change appropriately the value of the viewpoint position angle, for example, in correspondence to the time having elapsed since blinking of the blinker is started. For example, with increasing time having elapsed since the blinking start of the blinker, the viewpoint position angle may be changed such that the viewpoint is moved further toward the behind of the vehicle. Specifically, values of the viewpoint position angle corresponding to the time having elapsed since the blinking start of the blinker may be registered in a table in advance. Then, the image viewpoint control unit 13 may refer to the table so as to determine the viewpoint position angle. Alternatively, the value of the viewpoint position angle corresponding to the time having elapsed since the blinking start of the blinker may be defined by a formula in advance. Then, by using the formula, the image viewpoint control unit 13 may calculate the viewpoint position angle corresponding to the time having elapsed since the blinking start of the blinker.

As a result of the processing described above, the camera boundary control unit 12 and the image viewpoint control unit 13 according to Embodiment 7 determine the boundary position angle and the viewpoint position angle corresponding to the intended running direction of the vehicle. Then, the image processing unit 6 performs the image processing using the boundary position angle and the viewpoint position angle, onto the image data stored in the image buffer 5. As a result, an image corresponding to the intended running direction of the vehicle is generated and displayed on the display device 90. Thus, the driver obtains a more easily recognizable image in accordance with the running situation of the vehicle. Further, when the vehicle turns left or right at a crossing, the driver obtains an image permitting easier checking of the left or right rear field in a smoothly varying state.

The embodiments given above have been described for a case that the vehicle state determination unit 11 determines the state of the vehicle on the basis of a detection signal from each sensor included in the various sensors 80. However, the image processing apparatus 10 disclosed in the present application may detect the overall state of the vehicle on the basis of detection results from various sensors, and then display on the display device 90 an image corresponding to the overall state of the vehicle.

For example, in a situation that the present road of running is determined as a highway on the basis of the current position of the vehicle detected by the GPS sensor, it is assumed that the intended running direction of the vehicle is determined to be left or right on the basis of the blinker sensor. In this case, the vehicle state determination unit 11 infers that the vehicle is moving to an adjacent lane (traffic lane). Further, in a situation that the present place of running is determined as a residential district on the basis of the current position of the vehicle detected by the GPS sensor, it is assumed that the intended running direction of the vehicle is determined to be left or right on the basis of the blinker sensor. In this case, the vehicle state determination unit 11 infers that the vehicle is turning left or right.

As above, the vehicle state determination unit 11 detects the overall state of the vehicle on the basis of detection signals from individual sensors included in the various sensors 80. Thus, an image probable to be desired by the driver is provided in accordance with the overall state of the vehicle.

Figure 13A:
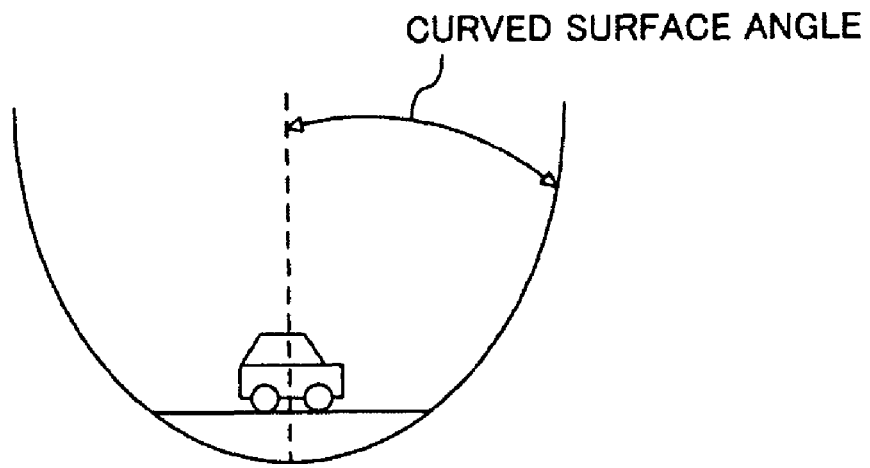
FIGS. 13A and 13B are schematic diagrams for describing curved surface angles.
Figure 13B:
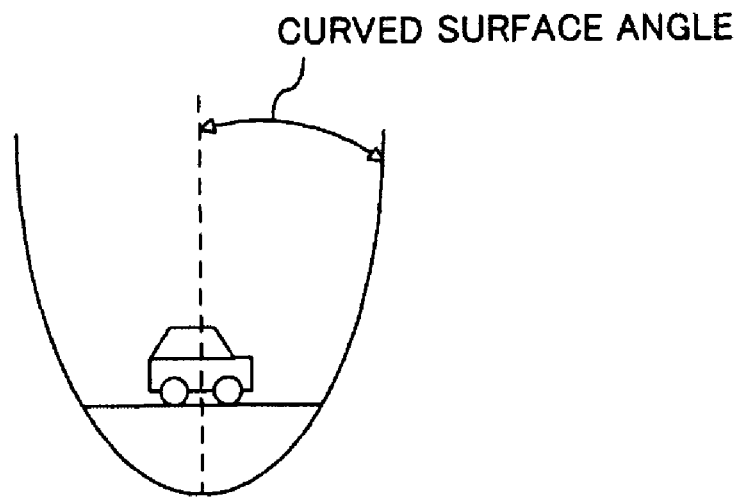

The image processing apparatus 10 of each embodiment described above has employed, as the parameters to be changed in correspondence to the running state of the vehicle, the boundary position angle and the viewpoint position angle used for generating a projection image data piece from four two-dimensional image data pieces. In addition to this configuration, the angle of the curved surface 62 of the curved surface image data contained in the three-dimensional model of the data 4a for three-dimensional image transformation illustrated in FIG. 6 may also be adopted as a variable parameter. FIGS. 13A and 13B are schematic diagrams for describing the curved surface angle. FIGS. 13A and 13B, illustrate longitudinal sections of three-dimensional models illustrated in FIGS. 6A, 6B, 7A, and 7B. FIG. 13A illustrates a three-dimensional model having a large curved surface angle, while FIG. 13B illustrates a three-dimensional model having a narrow curved surface angle.

In a case that the curved surface angle is variable, for example, when the characteristics of the current running position of the vehicle indicates a narrow alley, the image processing apparatus 10 changes the curved surface angle into a small value. Further, when the characteristics of the current running position of the vehicle indicates a place whose surroundings is open, the image processing apparatus 10 changes the curved surface angle into a large value. The changing of the value is performed stepwise. Thus, an image corresponding to whether the place of running is a place whose viewing field is open is displayed on the display device 90. Accordingly, the driver easily recognizes the surrounding situation by means of the image corresponding to the situation of the running place. Further, the size of the plane 61 indicated by the plane image data contained in the three-dimensional model of the data 4a for three-dimensional image transformation, the position in the vehicle data in the data 4a for three-dimensional image transformation, and the like may be changed.

The embodiments given above have been described for a case that the left camera 73 and the right camera 74 are attached to the center portions of the left and right side-surfaces of the vehicle. However, the left camera 73 and the right camera 74 may be attached to the door mirrors provided in the left and right doors of the vehicle. In this case, when the angles of the door mirrors are changed, the fields taken by the left camera 73 and the right camera 74 are also changed. Thus, for example, in a case that the vehicle is in a backward running state, when the angles of the door mirrors are changed such that the door mirrors are directed downward, the vicinity field behind the vehicle is efficiently taken by the left camera 73 and the right camera 74. Further, as a parameter other than the viewpoint position angle used for projecting three-dimensional image onto two dimensions, other parameters such as the distance between of the viewpoint and the vehicle and the magnification used for determining the two-dimensional projection plane may be changed similarly.

The embodiments given above have been described for a case that the image processing apparatus 10 is employed as an image processing system mounted inside a vehicle. However, it is not limited to an image processing system that is mounted inside a vehicle and that operates in linkage with a car navigation system. For example, the image processing apparatus 10 need not be mounted inside a vehicle as long as the environment permits obtaining of image data obtained by cameras attached to the vehicle and detection signals from various sensors 80 provided in the vehicle.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing apparatus processing image data obtained by surroundings image of a vehicle through a plurality of imaging devices mounted on the vehicle, comprising:

a state information obtaining unit obtaining state information that indicates a state of driving operation of the vehicle;

an image storage unit storing a plurality of two-dimensional image data pieces obtained from the plurality of imaging devices whose viewing fields partly overlap with each other;

a specifying unit compositing a plurality of two-dimensional image data pieces into a shape of a three-dimensional projection plane when the state information obtaining unit has obtained given state information, and then specifying, in correspondence to the state information, a compositing method for overlapping portions of viewing fields or transformation information to be used for transformation from a three-dimensional image based on the obtained three-dimensional image data into projection image data viewed from a position of a given viewpoint along a given line-of-sight direction; and an image transformation unit transforming the plurality of two-dimensional image data pieces stored in the image storage unit into projection image data viewed from the position of the given viewpoint along the given line-of-sight direction, by using the compositing method or the transformation information specified by the specifying unit.

2. An image processing apparatus processing image data obtained by surroundings image of a vehicle through a plurality of imaging devices mounted on the vehicle, comprising:

a state information obtaining unit obtaining state information that indicates a state of driving operation of the vehicle, from the vehicle at regular intervals or alternatively at occasions of a change;

an image storage unit storing a plurality of two-dimensional image data pieces obtained from the plurality of imaging devices whose viewing fields partly overlap with each other;

a specifying unit compositing a plurality of two-dimensional image data pieces stored in the image storage unit into a shape of a three-dimensional projection plane, and then specifying, in correspondence to the state information obtained by the state information obtaining unit, a compositing method for overlapping portions of viewing fields or the transformation information to be used for transformation from a three-dimensional image based on the obtained three-dimensional image data into projection image data viewed from a position of a given viewpoint along a given line-of-sight direction; and an image transformation unit transforming the plurality of two-dimensional image data pieces stored in the image storage unit into projection image data viewed from the position of the given viewpoint along the given line-of-sight direction, by using the compositing method or the transformation information specified by the specifying unit.

3. The image processing apparatus according to claim 1, wherein the specifying unit includes information concerning a compositing position that indicates a separation which relates to two-dimensional image data adopted in the overlap range of the plurality of two-dimensional image data pieces in the three-dimensional image data to be used when the plurality of two-dimensional image data pieces are composited into a shape of a three-dimensional projection plane or information that indicates a position of the viewpoint and a line-of-sight direction.

4. The image processing apparatus according to claim 2, wherein the specifying unit includes information concerning a compositing position that indicates a separation which relates to two-dimensional image data adopted in the overlap range of the plurality of two-dimensional image data pieces in the three-dimensional image data to be used when the plurality of two-dimensional image data pieces are composited into a shape of a three-dimensional projection plane or information that indicates a position of the viewpoint and a line-of-sight direction.

5. The image processing apparatus according to claim 1, further comprising:

a location obtaining unit obtaining location information that indicates a location; and a map storage unit storing map data and characteristics information that indicates characteristics of each place in the map data, wherein the state information obtaining unit obtaining from the map as the state information storage unit the characteristics information of the location indicated by the location information obtained by the location obtaining unit, and the specifying unit specifies compositing method or transformation information in accordance with the characteristics information obtained by the state information obtaining unit.

6. The image processing apparatus according to claim 2, further comprising:

a location obtaining unit obtaining location information that indicates a location; and a map storage unit storing map data and characteristics information that indicates characteristics of each place in the map data, wherein the state information obtaining unit obtains from the map storage unit as the state information the characteristics information of the location indicated by the location information obtained by the location obtaining unit, and the specifying unit specifies compositing method or transformation information in accordance with the characteristics information obtained by the state information obtaining unit.

7. The image processing apparatus according to claim 3, further comprising:

a location obtaining unit obtaining location information that indicates a location; and a map storage unit storing map data and characteristics information that indicates characteristics of each place in the map data, wherein the state information obtaining unit obtains from the map storage unit as the state information the characteristics information of the location indicated by the location information obtained by the location obtaining unit, and the specifying unit specifies compositing method or transformation information in accordance with the characteristics information obtained by the state information obtaining unit.

8. The image processing apparatus according to claim 4, further comprising:

a location obtaining unit obtaining location information that indicates a location; and a map storage unit storing map data and characteristics information that indicates characteristics of each place in the map data, wherein the state information obtaining unit obtains from the map storage unit as the state information the characteristics information of the location indicated by the location information obtained by the location obtaining unit, and the specifying unit specifies compositing method or transformation information in accordance with the characteristics information obtained by the state information obtaining unit.

9. The image processing apparatus according to claim 5, wherein
the characteristics information contains information that indicates which place is a highway or information that indicates which place is an urban area.

10. The image processing apparatus according to claim 1, wherein
the state information obtaining unit obtains, as the state information, running state information that indicates a running state of the vehicle, and
the specifying unit specifies compositing method or transformation information in accordance with the running state information obtained by the state information obtaining unit.

11. The image processing apparatus according to claim 2, wherein
the state information obtaining unit obtains, as the state information, running state information that indicates a running state of the vehicle, and
the specifying unit specifies compositing method or transformation information in accordance with the running state information obtained by the state information obtaining unit.

12. The image processing apparatus according to claim 1, wherein
the state information obtaining unit obtains, as the state information, surroundings state information that indicates a surroundings state of the vehicle, and
the specifying unit specifies compositing method or transformation information in accordance with the surroundings state information obtained by the state information obtaining unit.

13. The image processing apparatus according to claim 2, wherein
the state information obtaining unit obtains, as the state information, surroundings state information that indicates a surroundings state of the vehicle, and
the specifying unit specifies compositing method or transformation information in accordance with the surroundings state information obtained by the state information obtaining unit.

14. The image processing apparatus according to claim 12, wherein
the surroundings state information contains information that indicates an obstacle or a moving object located in surroundings of the vehicle or information that indicates a shape of a road where the vehicle runs.

15. The image processing apparatus according to claim 1, wherein
the three-dimensional image data contains vehicle image data that indicates the vehicle, plane image data that indicates a plane extending from a rectangular arrangement plane in which the vehicle is arranged, and curved surface image data that indicates a curved surface extending from the plane,
the plane image data contains: rectangular extended surface data that indicates an extended surface of approximately rectangular shape which is extended from each side of the arrangement plane and in which a plurality of polygons are arranged along the extension direction; and sector extended surface data that indicates an extended surface of approximately sector shape which is extended from each vertex of the arrangement plane and in which a plurality of polygons are arranged radially, and
the specifying unit specifies information concerning a straight line having an end at each vertex of the arrangement plane in the extended surface of approximately sector shape, as information concerning a compositing position that indicates a separation which relates two-dimensional image data adopted in the overlap range of the plurality of two-dimensional image data pieces in the three-dimensional image data to be used when the plurality of two-dimensional image data pieces are composited into a shape of a three-dimensional projection plane.

16. The image processing apparatus according to claim 2, wherein
the three-dimensional image data contains vehicle image data that indicates the vehicle, plane image data that indicates a plane extending from a rectangular arrangement plane in which the vehicle is arranged, and curved surface image data that indicates a curved surface extending from the plane,
the plane image data contains: rectangular extended surface data that indicates an extended surface of approximately rectangular shape which is extended from each side of the arrangement plane and in which a plurality of polygons are arranged along the extension direction; and sector extended surface data that indicates an extended surface of approximately sector shape which is extended from each vertex of the arrangement plane and in which a plurality of polygons are arranged radially, and
the specifying unit specifies information concerning a straight line having an end at each vertex of the arrangement plane in the extended surface of approximately sector shape, as information concerning a compositing position that indicates a separation which relates to two-dimensional image data adopted in the overlap range of the plurality of two-dimensional image data pieces in the three-dimensional image data to be used when the plurality of two-dimensional image data pieces are composited into a shape of a three-dimensional projection plane.

17. The image processing apparatus according to claim 1, further comprising:
an image output unit outputting to a display device the projection image data obtained by the transformation in the image transformation unit.

18. The image processing apparatus according to claim 2, further comprising:
an image output unit outputting to a display device the projection image data obtained by the transformation in the image transformation unit.

19. An image processing method performed with surroundings image of a vehicle through a plurality of imaging devices mounted on the vehicle, comprising:
obtaining state information that indicates a state of driving operation of the vehicle;
compositing a plurality of two-dimensional image data pieces obtained from the plurality of imaging devices whose viewing fields partly overlap with each other into a shape of a three-dimensional projection plane when given state information is obtained;
specifying, in correspondence to the state information, a compositing method for overlapping portions of viewing field or transformation information to be used for transformation from three-dimensional image based on the obtained three-dimensional image data into projection image data viewed from a position of a given viewpoint along a given line-of-sight direction; and
transforming, by using the transformation information or the compositing method having been specified, the plurality of two-dimensional image data pieces into projection image data viewed from the position of the given viewpoint along the given line-of-sight direction.

20. A recording medium capable of being read by a computer in which program for making the computer execute processing image data obtained by surroundings image of a vehicle through a plurality of imaging devices mounted on the vehicle, comprising:

obtaining state information that indicates a state of driving operation of the vehicle;

compositing a plurality of two-dimensional image data pieces obtained from the plurality of imaging devices whose viewing fields partly overlap with each other into a shape of a three-dimensional projection plane when given state information is obtained;

specifying, in correspondence to the state information, a compositing method for overlapping portions of viewing fields or transformation information to be used for transformation from three-dimensional image based on the obtained three-dimensional image data into projection image data viewed from a position of a given viewpoint along a given line-of-sight direction; and transforming, by using the compositing method or the transformation information having been specified, the plurality of two-dimensional image data pieces into projection image data viewed from the position of the given viewpoint along the given line-of-sight direction.

* * * * *